United States Patent [19]

Kinoshita et al.

[11] Patent Number: 5,734,724
[45] Date of Patent: Mar. 31, 1998

[54] AUDIO COMMUNICATION CONTROL UNIT

[75] Inventors: Ikuichiro Kinoshita; Shigeaki Aoki, both of Yokosuka; Manabu Okamoto; Nobuo Hayashi, both of Yokohama, all of Japan

[73] Assignee: Nippon Telegraph and Telephone Corporation, Tokyo, Japan

[21] Appl. No.: 608,082

[22] Filed: Feb. 28, 1996

[30] Foreign Application Priority Data

| Mar. 1, 1995 | [JP] | Japan | 7-041851 |
| Jun. 26, 1995 | [JP] | Japan | 7-159621 |
| Jun. 26, 1995 | [JP] | Japan | 7-159622 |

[51] Int. Cl.$^6$ ............................................. H04R 5/00
[52] U.S. Cl. .......................... 381/17; 379/202; 370/265; 370/266
[58] Field of Search .................... 381/17, 18, 1; 370/266, 260, 265; 379/202–206; 348/15, 16

[56] References Cited

U.S. PATENT DOCUMENTS

| 4,076,966 | 2/1978 | Bovo et al. | 379/202 |
| 4,734,934 | 3/1988 | Boggs et al. | 379/202 |
| 5,020,098 | 5/1991 | Celli | 379/206 |
| 5,373,549 | 12/1994 | Bales et al. | 370/260 |
| 5,436,896 | 7/1995 | Anderson et al. | 370/260 |

Primary Examiner—Curtis Kuntz
Assistant Examiner—Ping W. Lee
Attorney, Agent, or Firm—Pollock, Vande Sande & Priddy

[57] ABSTRACT

In an audio communication control unit, audio signals from at least three terminals connected to a switching part are branched to left- and right-channels audio signals, then the left- and right-channel audio signals are processed using sound image control parameters in such a manner as to impart them with target positions different for each terminal, then all left-channel audio signals corresponding to the respective terminals are mixed together into a left-channel mixed audio signal and all the right-channel audio signals are mixed together into a right-channel mixed audio signal, and these left- and right-channel mixed audio signals are distributed and sent to all the connected terminals.

14 Claims, 22 Drawing Sheets

AUDIO COMMUNICATION CONTROL UNIT

BACKGROUND OF THE INVENTION

The present invention relates to an audio communication control unit which controls the processing of audio signals in a multi-point teleconference which involves audio communications, such as an audio, video or multi-media conference that is held via a communication network.

An audio conference system, a multi-point video conference system or the like employs an audio communication control unit that mixes together audio signals received from conference participants after multiplying each audio signal by a weighting coefficient corresponding to the number of simultaneously speaking persons, for instance, and transmits the mixed audio signal to each conference participant.

Conventional audio communication control units are those which have means for mixing together audio signals received from all conference participants or means for demanding allowance to speak.

In the case of using only one channel (down-link channel) to transmit the audio signal to each location where a communication terminal is located (which audio signal will hereinafter referred to as a down-link audio signal), there arise such problems as listed below With a scheme that mixes audio signals of plural speakers together, when two or more parties speak simultaneously, the audio signals are mixed and a mixed sound is reproduced using one sound driver (or loudspeaker). This deteriorates the intelligibility for the listener and makes it difficult for him to identify the speakers. Furthermore, it would be necessary for each participant to carry out some operations for transmitting a demand to speak when the participant wanted to utter in the teleconference and also the communication control unit has to manage all the demands, thus preventing the participants from free conversations.

On the other hand, it is known in the art that a spatial sense of each speaker's voice originating from a unique position assists in identifying the speaker and improves speech intelligibility (D. R. Begault, "Multichannel Spatial Auditory Display for Speech Communications," Journal of the Audio Engineering Society, 42, pp. 819–826, 1994). What is intended to mean by the sound localization mentioned herein is to make the listener judge the position of the sound he is hearing. Usually, the imaged position of a sound coincides with the real position of the sound source. However, there has been devised a technique to enable a listener to localize the sound image at a target position.

Now, a brief description will be given of a typical scheme for localization of multiple sounds at respective target positions. As shown in FIG. 2, acoustic transfer functions such as head-related transfer functions $H_{2L}$ and $H_{1R}$ from a sound source 1 to the left and right ears of the listener in FIG. 1 are each convolved in an audio signal $S_1$. At the same time, acoustic transfer functions $H_{2L}$ and $H_{2R}$ from a sound source 2 to the left and right ears are similarly convolved in an audio signal $S_2$ different from $S_1$. The audio signals resulting from the convolution are mixed together and the mixed audio signal is presented to the both ears over a stereo headset. By this, sound stimuli $S_1 * H_{1L} + S_2 * H_{2L}$ and $S_1 * H_{1R} + S_2 * H_{2R}$, which are equivalent to those when the audio signals reach both ears of the listener from the sound sources 1 and 2, are given to the left and right ears, respectively, as shown in FIG. 2. In such an instance, the listener can localize sound images for the audio signals $S_1$ and $S_2$ at the same spatial positions as those of the sound sources 1 and 2 in FIG. 1. Other schemes are also described in detail, for example, in J. Blauert, Gotoh and Morimoto, "Spatial Hearing. The Psychophysics of Human Sound Localization," (Cambridge, Mass.: MIT Press, 1983) and so forth.

A prior art example that applies the above-described findings to multi-point audio communication is teleconference terminal described in Japanese Pat. Laid-Open Gazette No. 10744/92, for instance. As depicted in FIG. 3, the communication terminal equipment proposed in the past has means 3L and 3R for processing audio signals from another terminal. For the signal processing, parameters related to respective target positions are employed. For the control of the terminals, it is indispensable to preassign an identification number (or a terminal address) ID to each terminal (or conference participant) and whenever a participant is to transmit his audio signal, he has to transmit his number ID together with the audio signal. The communication terminal shown in FIG. 3 receives an identification number ID which specifies the origination of the received audio signal. That is, a received signal from another communication terminal is separated by a signal separation part into an ID and audio signal. In response to the separated ID code, a switch control part selects speech signal processing means 3R and 3L, which perform convolution of a pair of acoustic transfer functions corresponding to one of the spatial positions allotted to the terminal having that ID. The speech signal from the signal separation part is fed to the selected pair of speech signal processing means 3R and 3L and convolved with the pair of transfer functions to reproduce a sound image which is localized at the allotted spatial position. Accordingly, the introduction of this prior art communication terminal at each location necessitates procedures for transmission of an identification number, thus restricting the feasibility of the prior art communication system. These shortcomings hinder an economical implementation of multi-point audio telecommunications of the type in which voices of parties can be localized at respective positions.

For two-point teleconferencing service, there has also been proposed a system that detects acoustic environments in a conference room at a local station by, for example, a stereo microphone, and information of the environments is coded and transmitted to the other remote station (U.S. Pat. No. 5,020,098, for instance). Application of this system to a three- or more-point teleconference, however, demands to connect communication channels among the respective locations. In addition each terminal must be provided with a decoding device.

FIG. 4 shows another prior art system, in which terminals 4 are each equipped with sound localization signal processing means 4A and interconnected to one another over network communication channels. In this case, the number $C_M$ of communication channels needed is at least $M(M-1)/2$, where M is the number of terminals 4 to be interconnected. This connection scheme is impractical because with the increase in the number M, the required number of channels to be interconnected for all possible combinations increases rapidly by the factor of about $M^2$.

As a modification of the method for the realization of the multi-point audio telecommunication of the type wherein the listener localizes the voice of each party at a different spatial position through utilization of sound localization techniques similar to those above-mentioned, there has been proposed a method that conducts communication among the terminals of two or more desired groups of respective points as described in, for example, Cohen., Koizumi N. and Aoki S., "Design and Control of Shared Conferencing Environments or Audio Telecommunication," Proc. Int. Symp. on Measurement and Control in Robotics, pp. 405–412, Nov. 1992.

This method also requires that each terminal be provided with audio signal processing means for processing the audio signal transmitted over the communication line from each location to localize the voice of each speaker at a different position, and mixing means for mixing audio signals generated by the audio signal processing means. Further, it is necessary to specify the originating location and transmit the audio signal for each location. To meet this requirement, the communication system to be used needs to be predetermined. This leaves unsettled the problem of requiring pre-determination of the communication system used.

It is therefore an object of the present invention to provide an audio communication control unit which permits the implementation of a multi-point teleconference that yields high intelligibility for multiple audio sounds in case of multiple simultaneous utterances without the need of equipping each terminal with high audio signal processing capability.

Another object of the present invention is to provide an audio communication control unit which allows any terminals accommodated in a communication network, to access and make use thereof.

A further object of the present invention is to provide an audio communication control unit which simultaneously implements one or more communications among a desired combination of connected terminals where each participant localizes sounds originated from respective terminals speakers at respective positions.

SUMMARY OF THE INVENTION

According to the present invention, an audio communication control unit for teleconferencing, which is connected via communication network to a plurality of terminals, comprises:

a switching part for switching audio signals received from N terminals via said communication network, N being an integer equal to or greater than three;

N input channels connected to said switching part and supplied with the input audio signals from said N terminals, respectively;

a channel branching part for branching each of said input audio signals from said N input channels to K branched audio signals of K branched channels, K being an integer equal to or greater than 2;

a sound image control part for processing said K branched audio signals of said K branched channels corresponding to each of said N input channels with a corresponding one of N parameter sets each including K sound image control parameters of predetermined kind or kinds to produce sound-image controlled audio signals of K branch channels corresponding to each of said N input channels, at least one of said N parameter sets being different from the other parameter sets according to target position of said terminals;

a mixing part for mixing said sound-image controlled audio signals of K branch channels corresponding respectively to said N terminals, for each branch channel, to thereby generate mixed audio signals of K channels; and a terminal-associated branching part for branching said mixed audio signals of K channels in correspondence with said N terminals for input into said switching part.

BRIEF DESCRIPTION OF THE DRAWINGS

FIGS. 9A–9D, is a waveform diagram for explaining a speaker identifying method;

DESCRIPTION OF THE PREFERRED EMBODIMENTS

Figure 5:
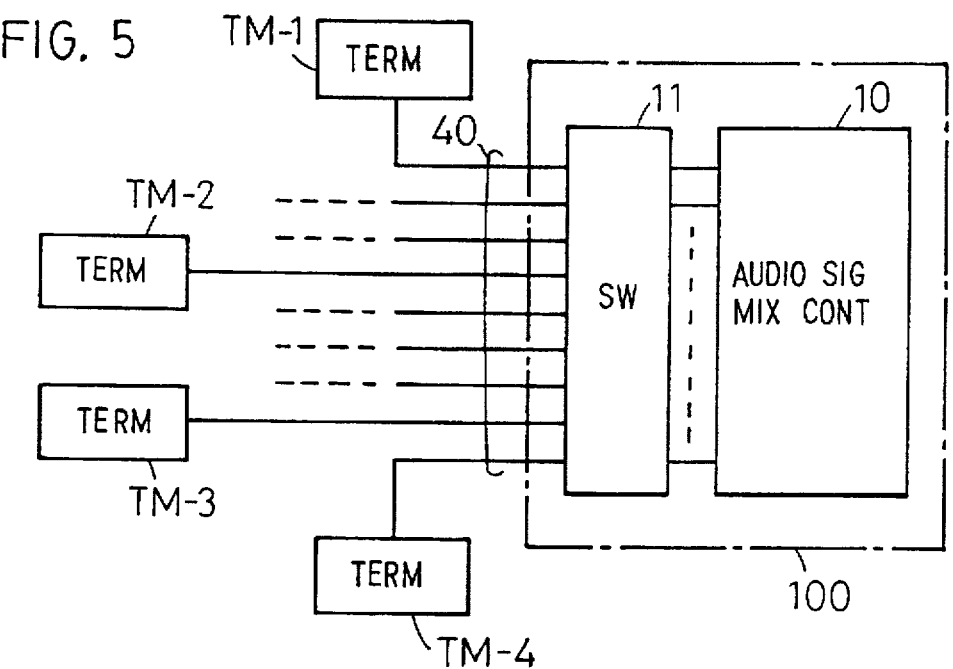
FIG. 5 is a block diagram showing, by way of example, the accommodation of communication channels for use with an audio communication control unit 100 according to the present invention.

FIG. 5 schematically illustrates the general configuration of a multi-point teleconference system using the audio communication control unit according to the present invention. The audio communication control unit of the present invention, identified generally by 100, has a switching part 11, which is connected to a communication network 40 such as ISDN or LAN and is accessible by each terminal connected thereto. Owing to limitations on the capacity and the throughput of the audio communication control unit 100, the maximum number N of conference participants (or the number of terminals) who are allowed to simultaneously participate in a conference is prescribed, N being an integer equal to or greater than 3. For example, four conference participating terminals TM-1 to TM-4 are connected via communication network 40 and the switching part 11 to four of N input channels $C_1$ to $C_4$. The input channels $C_1$ to $C_N$ are connected therethrough to an audio signal mixing control part 10, constituting a multi-point teleconference system which enables the conference participants to talk to one another. As described later in detail, the audio signal mixing control part 10 processes the audio signal originated from each terminal by using one kind of sound image control parameters relating to a sound image such as levels (or level, attenuation, amplification, etc.), delays, phases and transfer functions or a desired combination thereof so that at least one set of the sound image control parameters operates on audio signals from one terminal and other sets of the sound image control parameters operate on audio signals from other terminals.

Figure 6:
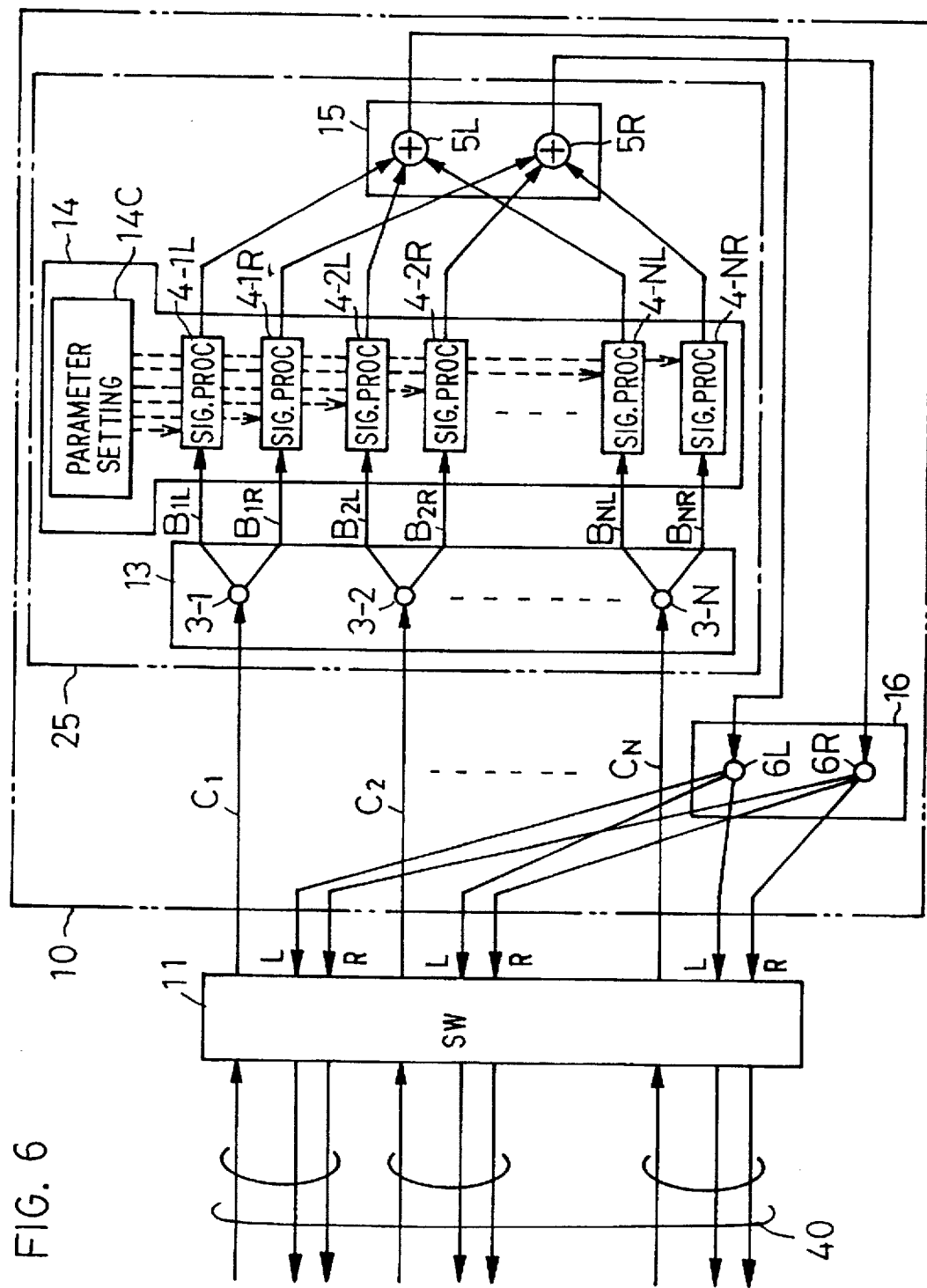
FIG. 6 is a block diagram illustrating the basic construction of the audio communication control unit according to the present invention.

FIG. 6 illustrates in block form the basic configuration of the audio communication control unit 100 of the present invention for use in the system of FIG. 5. The switching part 11 selectively connects the communication channels from terminals requesting to participate in a conference to the audio signal mixing control part 10 via the N input channels $C_1$ to $C_N$. The audio signal mixing control part 10 comprises: a channel branching part 13 by which audio signals fed to the N input channels $C_1$ to $C_N$ from a maximum of N connected terminals are each branched into audio signals on predetermined K branch channels (where K is an integer equal to or greater than 2, and in FIG. 6, K is set to 2, each corresponding to one of left and right channels) $B_{JL}$ and $B_{JR}$ (J=1, ..., N); a sound image control part 14 which controls N sets of K-channel branched audio signals by predetermined sound image control parameters; a mixing part 15 which mixes N channel-associated corresponding ones of N sets of sound-image controlled K-channel audio signals to generate K-channel mixed audio signals; and a terminal-associated branching part 16 which branches the K-channel mixed audio signals into N sets of K-channel signals, respectively, for input into the switching part 11. The channel branching part 13, the sound image control part 14 and the mixing part 15 constitute an audio signal processing part 25. The switching part 11 mediates therethrough the N sets of K-channel signals to the N conference participating terminals TM-1 to TM-N. In FIG. 6 two-channel (K=2) audio signals are each sent from the switching part 11 to one of the participating terminals over two down-link channels.

As described above, FIG. 6 shows the case of K=2, and the input audio signals are each branched into two-channel branched audio signals at one of branch points 3-1, 3-2, ..., 3-N in the channel branching part 13. In FIG. 6 the two channels are shown to correspond to left and right channels as in the prior art. The parts related to the left channel are each identified by a suffix L to their reference numerals and the parts related to the right channel are identified by a suffix R. The sound image control part 14 comprises N sets of signal processing parts 4-1L, 4-1R, 4-2L, 4-2R, ..., 4-NL, 4-NR and processes the branched audio signals by using predetermined kinds of sound image control parameters, respectively.

As described earlier, it is possible to use, as the sound image control parameters, various kinds of parameters, such as level, phase, delay and acoustic transfer functions. Brief descriptions will be given below about the effects on sound images by each of those parameters, assuming that the number of branches with which each input audio signal is branched at each branching point is two.

(a) In the case of using levels (either one of volume, attenuation factor and amplification factor) as the sound image control parameters, the direction of a sound image reproduced by left and right loudspeakers in association with the input audio signal can be set to a desired direction between the two loudspeakers by controlling the relative levels of the left- and right-branched audio signals corresponding to the input audio signal.

(b) In the case of using phases (in-phase or inverted phase) as the sound image control parameters, the sound image reproduced by left and right loudspeakers can be provided with or deprived of perspective by controlling the phase of the left and right branched audio signals corresponding to the input audio signal to be in-phase or inverted phase to each other.

(c) In the case of using delay as the sound image control parameters, the direction of the sound image reproduced by left and right loudspeakers (or a stereo-headset) can be set to a desired direction around a listener by controlling the relative delay of the left and right branched audio signals corresponding to the input audio signal.

(d) In the case of using acoustic transfer functions as the sound image control parameters, the sound image reproduced by a stereo-headset can be localized at a desired spatial position by convolving a pair of acoustic transfer functions corresponding to the target position with the left and right branched audio signals corresponding to the input audio signal.

The sound image control parameters are provided from a parameter setting part 14C to the signal processing parts 4-1L, 4-1R, 4-2L, 4-2R, ..., 4-NL, 4-NR. The sound image control parameters may be determined in accordance with, for example, the number of conference participants. In the case of FIG. 6, the audio signals from the signal processing parts 4-1L, 4-2L, ..., 4-NL are mixed by a mixer 5L in the mixing part 15 into a left-channel mixed audio signal, whereas the audio signals from the signal processing parts 4-1R, 4-2R, ..., 4-NR are mixed by a mixer 5R in the mixing part 15 into a right-channel mixed audio signal.

Hence, the K-channel signals, which are distributed from the terminal-associated branching part 16 to the respective terminals TM-1 to TM-N, contain components derived from audio signal arrived from all the participating terminals.

Figure 7:
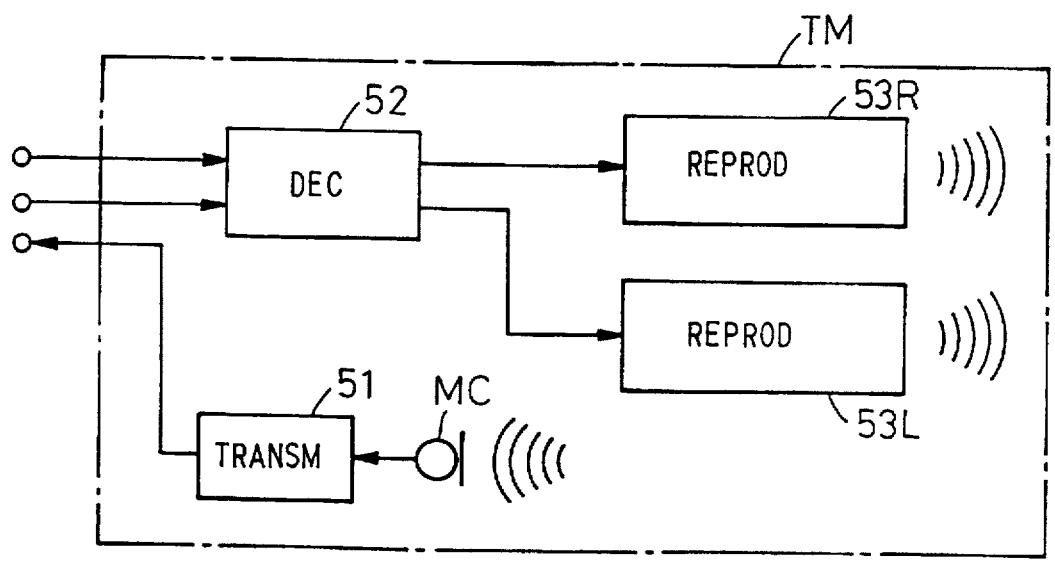
FIG. 7 is a block diagram showing an example of the terminal configuration for use in the system of FIG. 5.

As depicted in FIG. 7, the terminals TM-1 to TM-N are each composed of a microphone MC, a transmitting part 51, a decoding part 52 and reproducing parts 53L and 53R. The received K-channel (K=2) encoded audio signal is decoded by the decoding part 52 into audio signals of the respective channels, which are transduced by the reproducing parts 53L and 53R into sounds. Hence the sounds, to which the user of each terminal TM listens, may contain voices sent from all participating terminals.

According to the present invention, by selecting different sound image control parameters for the N sets of branched audio signals in the sound image control part 14, a participant at each terminal TM can discern the sound of the voice, originated from at least one of the terminals, from the sound of the voices originated from the other remaining terminals. The properties of the sound image to be controlled are such as the spatial position and spaciousness that the listener psycho-acoustically or auditorily perceives. For example, when the reproducing parts 53L and 53R of the terminal are loudspeakers, the sound image could be controlled by using, as the sound image control parameters for the left- and right-channel audio signals, any one of interchannel level difference, interchannel delay difference and relative phase (in phase, opposite phase) or a combination of the level difference and the time difference. By using such predetermined sound image control parameters which are operated on the N sets of left and right audio signals in the signal processing parts 4-1L, 4-1R, 4-2L, 4-2R, ..., 4-NL, 4-NR of the sound image control part 14 in FIG. 6, a desired sound image could be reproduced at each terminal. When a headset is used as the reproducing parts 53L and 53R in FIG. 7, the number of channels is limited to K=2. By convolving the N sets of left and right speech signals with transfer functions corresponding to desired target positions of the sound sources, as sound image control parameters, in the sound image control part 14 in FIG. 6, a mixed sound is reproduced by the reproducing parts 53L and 53R in FIG. 7 so that each component originated from each terminal can be localized at desired target positions.

A description will be given of embodiments of the present invention in connection with the case where K=2, and when the reproducing parts of each terminal are loudspeakers, K≧3 is also possible.

With reference to the drawings, concrete operative examples of the invention will hereinbelow be described.

FIRST EMBODIMENT

Figure 8:
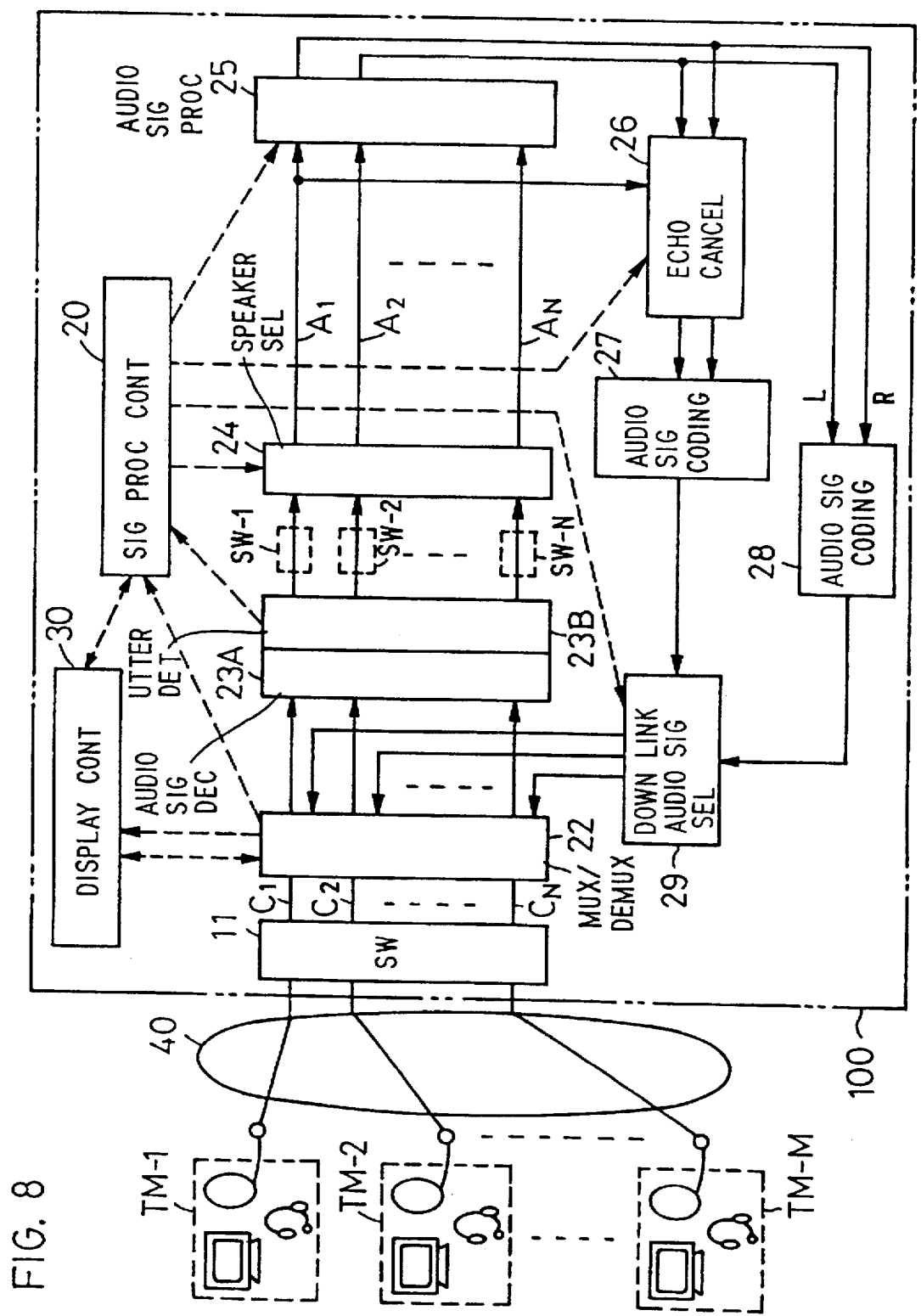
FIG. 8 is a block diagram illustrating an audio communication control unit according to a first embodiment of the present invention.

FIG. 8 illustrates a first embodiment of the audio communication control unit based on the basic configuration of FIG. 6 according to the present invention, wherein a plurality of terminals TM-1 to TM-M are connected via communication lines 40 to the audio communication control unit 100 of the present invention. In this embodiment, a principal speaker as an origin of audio signals is judged by monitoring the audio signals on the input channels $C_1$ to $C_N$ from the switching part 11 connected to a plurality of participating terminals. In the audio communication control unit 100, the audio signals from all the participating terminals are processed so that listeners can distinguish the judged sound position originated from the principal speaker from the judged sound position originated from the speaker at any other terminal.

The audio communication control unit 100 of this embodiment comprises the switching part 11, audio signal and control signal or video signal multiplexing/demultiplexing part 22, an audio signal decoding part 23A, an utterance detection processing part 23B, a speaker selecting part 24 for selecting speakers whose sounds are to be mixed together, an audio signal processing part 25, an echo cancelling part 26, audio signal coding parts 27 and 28, a down-link audio signal selecting part 29, a signal processing control part 20 and an image display control part 30. The switching part 11, the multiplexing/demultiplexing part 22, the audio signal decoding part 23A and the utterance detection processing part 23B each perform processing corresponding to the terminal as the origin of the audio signal and have a throughput or capability for processing audio signals originated from the maximum number N of simultaneously accessed terminals.

In FIG. 8 there is illustrated, as an example of the terminal TM, a video conference terminal that transmits and receives video information and speech information at the same time. Since the presence of video information is irrelevant to the present invention and since the video display control part 30 is not directly related to the subject matter of the invention, no detailed description will be given of video display control. However, video information could be utilized to operate the conference in which the terminals TM-1 to TM-N are each to participate and to control the combination of conference participants. In such a case, a signal related to audio signal mixing control is applied from the video display control part 30 to the signal processing control part 20.

The operation of the audio communication control unit 100 will hereinafter be described in connection with the case where M terminals (TM-1 to TM-M) are connected via the communication lines 40 to the unit 100.

The communication lines 40 used are those capable of interactive audio communication, such as N-ISDN lines, leased lines, analog telephone circuits, LAN circuits, individual circuits, or multiplexed logical circuits. Additionally, it does not matter whether the communication channels are wired or radio channels if the switching part 11 is adapted to the type of communication network 40. This embodiment will be described to use N-ISDN circuits (assigning transmission bands of 64 kb/s for video and 64 kb/s for audio).

For example, video conference terminals designed for N-ISDN lines can be used as the terminals TM-1 to TM-M. In this instance, the terminals TM-1 to TM-M need to have the function of receiving two-channel audio signals.

The terminals TM-1 to TM-M are connected via the communication network 40 to the switching part 11 of the audio communication control unit 100. Video and audio signals and control signal for controlling the combination of participating terminals, multiplexed into one channel by standard regulations such as ITU-T Recommendation H. 221 and sent from the terminals TM-1 to TM-M, are demultiplexed by the multiplexing/demultiplexing part 22. The video signal and the video display control signal thus demultiplexed are sent to the video display control part 30. Since the video display control is not directly relevant to the present invention, no description will be given thereof.

The audio or speech control information is sent from the multiplexing/demultiplexing part 22 to the audio signal processing control part 20. As the speech control information, it is possible to employ information such as a request for participation/leave the conference. The audio signals demultiplexed in the multiplexing/demultiplexing part 22 are each decoded in the audio signal decoding part 23A into, for example, a PCM-encoded audio signal for subsequent processing. For the sake of brevity, the signal will be referred to simply as an audio signal in the processing described below.

Figure 9:
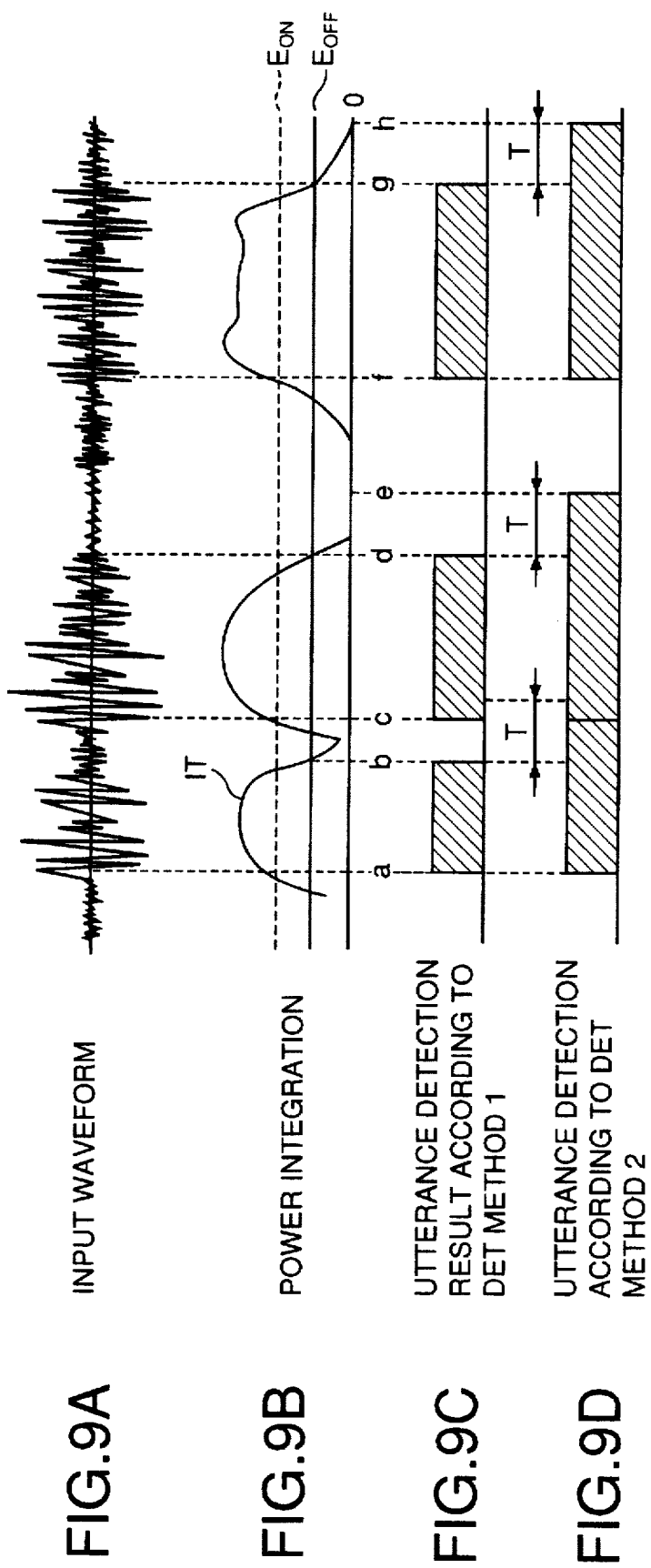
FIG. 9, comprising

The utterance detection processing part 23B detects speech by, for instance, monitoring the power of the audio signal. When detecting speech, the speech detecting control part 23B supplies the signal processing control part 20 with a control signal representing the utterance. In FIG. 9 there is shown an example of the utterance detecting scheme in the utterance detection processing part 23B. On the basis of the input audio signal (FIG. 9A), an integrated power IT over a unit time (for 100 ms, for instance) (FIG. 9B) is estimated. Then the integrated power value IT is compared with an ON-detection threshold $E_{ON}$ and an OFF-detection threshold $E_{OFF}$ to judge the utterance at the terminal.

With a first utterance identification scheme, when the unit-time integrated power IT exceeds the ON-detection threshold $E_{ON}$, utterance at the terminal concerned is immediately judged, and when the integrated power IT decreases lower than the OFF-detection threshold $E_{OFF}$, it is immediately decided that the terminal is in the non-speaking or silent state. Therefore, utterance is judged during the diagonally shaded periods (a–b, c–d, f–g) in FIG. 9C. According to the first identification scheme, the utterance-silence judgement is frequently switched.

A second utterance identification scheme differs from the first scheme in that the former judged the utterance on the assumption that the utterance is assured to be continued for a certain period (T in FIG. 9D) after the unit-time integrated power IT falls below the OFF-detection threshold $E_{OFF}$. According to this scheme, utterance is judged during the diagonally shaded periods (a–e, f–h) in FIG. 9D.

The audio signal originated from the terminal where utterance is detected in the utterance detection processing part 23B is selected in the speaker selecting part 24 in FIG. 8. The selected audio signal is provided to the audio signal processing part 25 via any one of selected audio signal channels $A_1$ to $A_N$. The audio signal processing part 25 includes the channel branching part 13, the sound image control part 14 and the mixing part 15 that are principal components of the present invention.

The signal processing control part 20 operates on control signals received from the multiplexing/demultiplexing part 22 and the utterance detection processing part 23B or a conference control signal from the video display control part 30. Taking into account the number of persons currently speaking, the number of persons requesting to speak and other conditions, for example, a chairperson who must preferentially be given the allowance to speak at all times, the signal processing control part 20 determines those of the selected audio signal channels corresponding to the terminals, whose audio signal is to be mixed, and their priorities. The speaker selecting part 24 connects the selected audio signal channels $A_1$ to $A_N$ to the input channels positions following the determined priorities. In this embodiment, it is assumed that the audio signal originated from the principal speaker is mediated to the selected audio signal channel $A_1$ and second to N-th speakers to the selected audio signal channels $A_2$ to $A_N$.

The signal processing control part 20 controls the operation of the audio signal processing part 25 to mix and distribute audio signals originated from multiple speakers without deterioration of intelligibility of the sound from the principal speaker. In this example the audio signal processing part 25 assigns the audio signal to the left-channel audio signal and the audio signals originated from the other speakers to the right-channel signal both to the audio signal coding part 28.

The audio signal coding part 28 encodes and multiplexes the two-channel stereo mixed audio signals from the audio signal processing part 25 by a stereo encoder. The down-link audio signal selecting part 29 corresponds to the terminal-associated branching part 16 in FIG. 6 and, for the communication network corresponding to the terminals other than that of the principal speaker, selects the encoded stereo mixed audio signal from the audio signal coding part 28. As for the line corresponding to the terminal of the principal speaker, the stereo audio signal encoded by the audio signal coding part 27 is selected. In this case, however, the signal originated from the principal speaker is cancelled by the echo cancelling part 26 from the left- and right-channel mixed audio signals for echo suppression prior to coding. The selected audio signals are each applied to the multiplexing/demultiplexing part 22.

The multiplexing/demultiplexing part 22 multiplexes the stereo audio signals from the down-link speech selecting part 29 and video information from the video display control part 30 and sends the multiplexed signals to the terminals TM-1 to TM-M from the switching part 11 via the communication lines 40.

The audio signal mixing processing and sound image control processing based on human hearing or auditory characteristics and the prevailing custom in conferences are performed in the audio signal processing 25. As mentioned previously herein, the audio signal processing part 25 has the signal channel branching part 13, the sound image control part 14 and the audio signal mixing part 15 in FIG. 6. This embodiment controls the branched audio signal of each selected audio signal channel by using, as the sound image control parameters, attenuation for controlling the interchannel level difference and phase for controlling the left- and right-channel audio signals to be in-phase or opposite phase.

Figure 10:
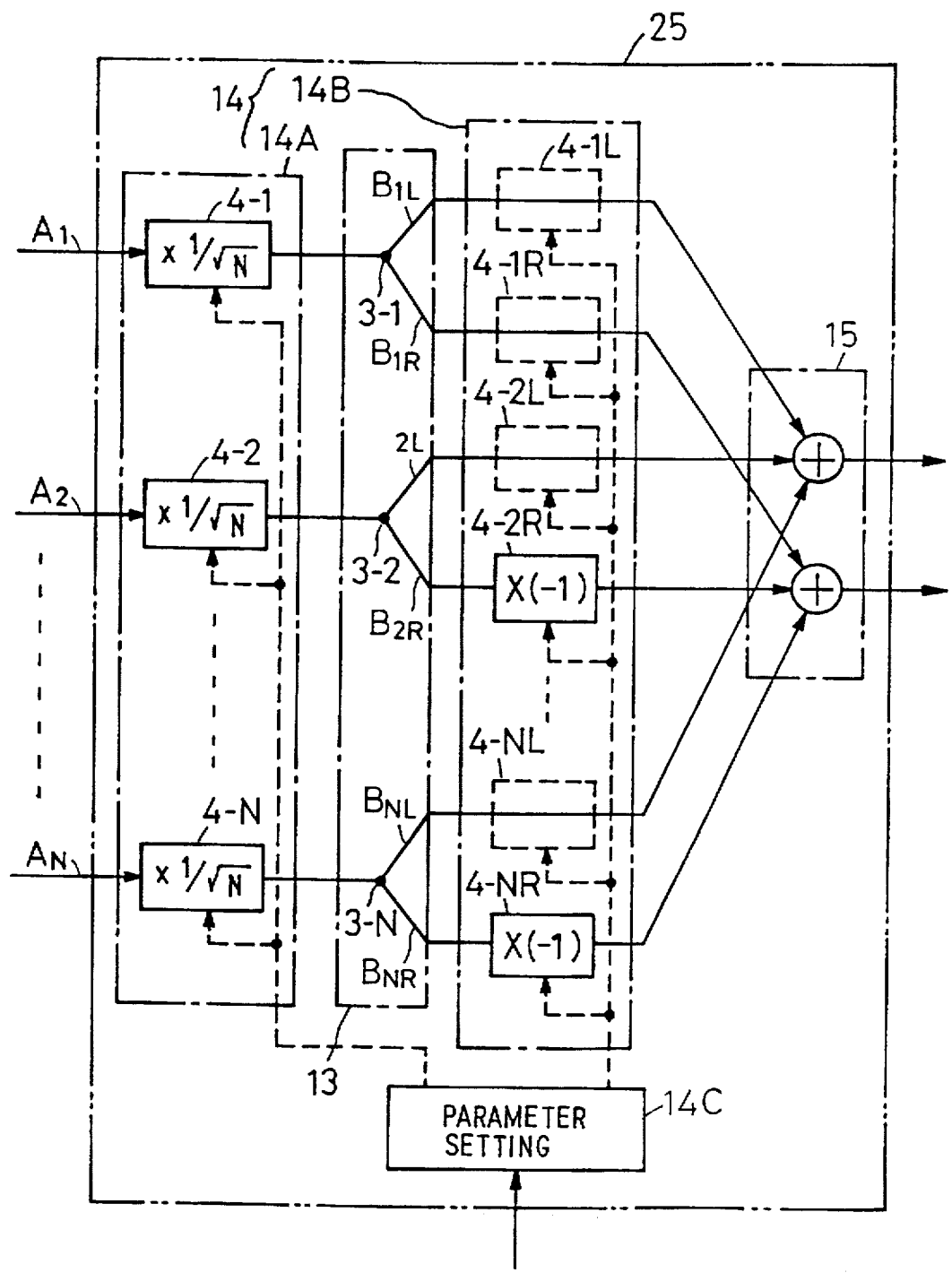
FIG. 10 is a block diagram showing an example of the construction of an audio signal processing part 25 in FIG. 8.

FIG. 10 illustrates a concrete example of the audio signal processing part 25, in which the branched audio signals are controlled using the interchannel phase relation as the sound image control parameter. A level control part 14A and a phase control part 14B constitute the sound image control part 14. The audio signals of the selected audio signal channels $A_1$ to $A_N$ are attenuated by attenuators 4-1, 4-2, ... 4-N of the level control part. 14A to $\tfrac{1}{2}^{1/2}$-, $1/N^{1/2}$-, ..., $1/N^{1/2}$-fold levels, respectively. The audio signals outputted from the attenuators 4-1 to 4-N are branched at branch points 3-1, 3-2, ..., 3-N in the channel branching part 13 to left- and right-channel signals on left and right branched channels $B_{1L}$, $B_{1R}$, ..., $B_{NL}$, $B_{NR}$, respectively, which are fed to the phase control part 14B, wherein they are controlled by phase controllers 4-1L, 4-1R, 4-2L, 4-2R, ..., 4-NL, 4-NR to be in-phase or 180 degrees out-of-phase with each other. The sound image control parameters such as attenuation and phase are set in the parameter setting part 14C under the control of the signal processing control part 20.

The audio signal originated from the principal speaker, that is, the signal of the selected audio signal channel $A_1$ is attenuated by using the attenuator 4-1 to $\tfrac{1}{2}^{1/2}$ and branched at the branch point 3-1 to left- and right-channel signals, which are controlled by the phase controllers 4-1L and 4-1R to be in-phase with each other and provided to the mixers 5L and 5R, respectively. The left- and right-channel audio signals at the outputs of the mixers 5L and 5R correspond to the left- and right-channel audio signals at the receiving terminal. Hence, when listening over a stereo reproduction system, the listener at the receiving terminal is able to hear the audio sound on the selected audio signal channel $A_1$ (originated from the principal speaker) in perspective with its sound image localized at the center of the reproduction system.

The audio signals of the selected audio signal channels $A_2$ to $A_N$ are branched at the branch points 3-2 to 3-N into left and right channels after being attenuated by the attenuators 4-2 to 4-N, for example, $1/N^{1/2}$-fold (N being the number of selected audio signal channels $A_1$ to $A_N$) So that the sum of the speech power levels of the audio signals on the selected audio signal channels $A_2$ to $A_N$, reproduced at each terminal, may be equal to or smaller than the level of the reprooduced speech of the principal speaker. The left-channel audio signals are held in-phase by the phase controllers 4-2L to 4-NL and applied to the mixer 5L, whereas the right-channel audio signals are phase inverted (multiplied by −1) by the phase controllers 4-2R to 4-NR and then applied to the mixer 5R.

When presented with sounds in opposite phase from the left and right channels in stereo reproduction, the listener could not perceive the sound images close to his head in perspective. Through utilization of this human hearing or auditory characteristic, the subordinate audio signals fed to the selected audio signal channels $A_2$ to $A_N$ are perceived by the listener at each terminal without perspective (i.e. without a sense of distance about him) when he listens over the stereo reproduction system. On the other hand, the sound originated from the principal speaker is localized in a fixed position. The attenuators 4-1 to 4-N in the level control part 14A of the audio signal processing part 25 shown in FIG. 10 are to make the level of the sound originated from the principal speaker reproduced at each terminal larger than the sum of the levels of the sound originated from the other speakers. The difference of localization between the sound originated from the principal speaker and the sound originated from the other speakers is provided solely depending on whether the left- and right-channel audio signals are controlled to be in-phase or opposite phase-of-phase in the phase control part 14B.

Figure 11:
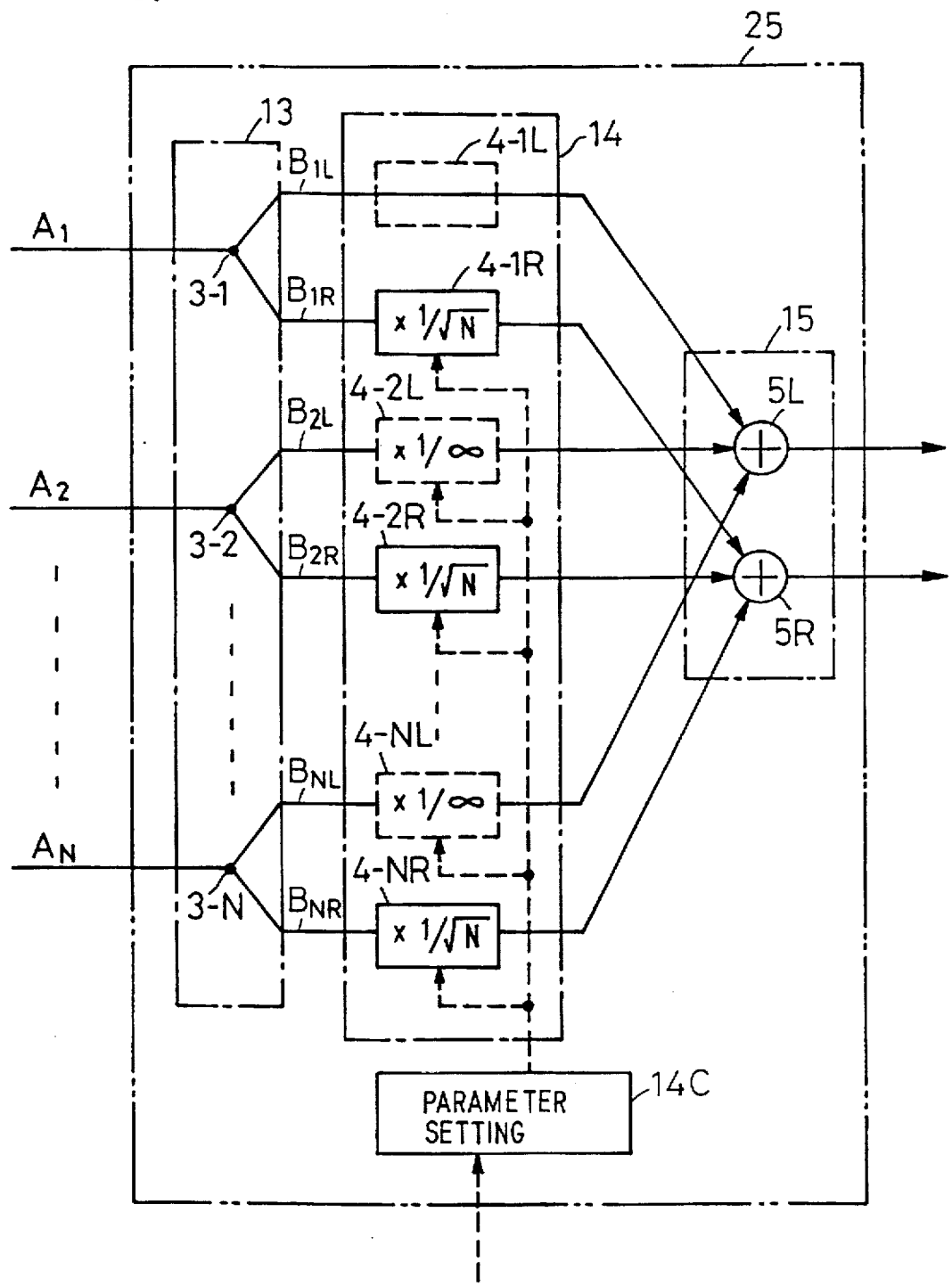
FIG. 11 is a block diagram showing another example of the construction of the audio signal processing part 25 in FIG. 8.

FIG. 11 illustrates another embodiment of the audio signal processing part 25, which is designed so that at each terminal only the sound originated from the principal speaker is reproduced by using the left-hand loudspeaker, for instance, and mixed sound originated from all speakers are reproduced by the right-hand loudspeaker with its power level held equal to or lower than the power level of sound originated from the principal speaker. In the right channels $B_{1R}$ to $B_{NR}$ branched by the channel branching part 13, there are introduced the attenuators 4-1R, 4-2R, . . . , 4-NR of an attenuation factor $N^{1/2}$; the attenuation of the attenuator 4-1L in the branched left channel $B_{1L}$ for the principal speaker is set to zero and an attenuation sufficiently larger than the attenuation factor $N^{1/2}$ in the right channel, for example, an infinite attenuation, is set in each of the attenuators 4-2L, . . . , 4-NL of the left channels $B_{2L}$ to $B_{NL}$ (that is, the channels are held OFF). Accordingly, only the audio signal of the selected audio signal channel $A_1$ for the principal speaker is applied to the left-channel mixer 5L without being attenuated and the signals of all the selected audio signal channels $A_1$ to $A_N$ are applied to the right-channel mixer 5R after being attenuated by the attenuators 4-1R to 4-NR to an appropriate volume of, say, $1/N^{1/2}$.

The listener at each receiving terminal listens to the sounds from the principal speaker and other speakers at the same time, localizing at different positions. Hence it is possible to realize a multi-point teleconference wherein the listener can clearly hear the sound originated from the principal speaker at all times as well as the sounds originated from other speakers.

Figure 12:
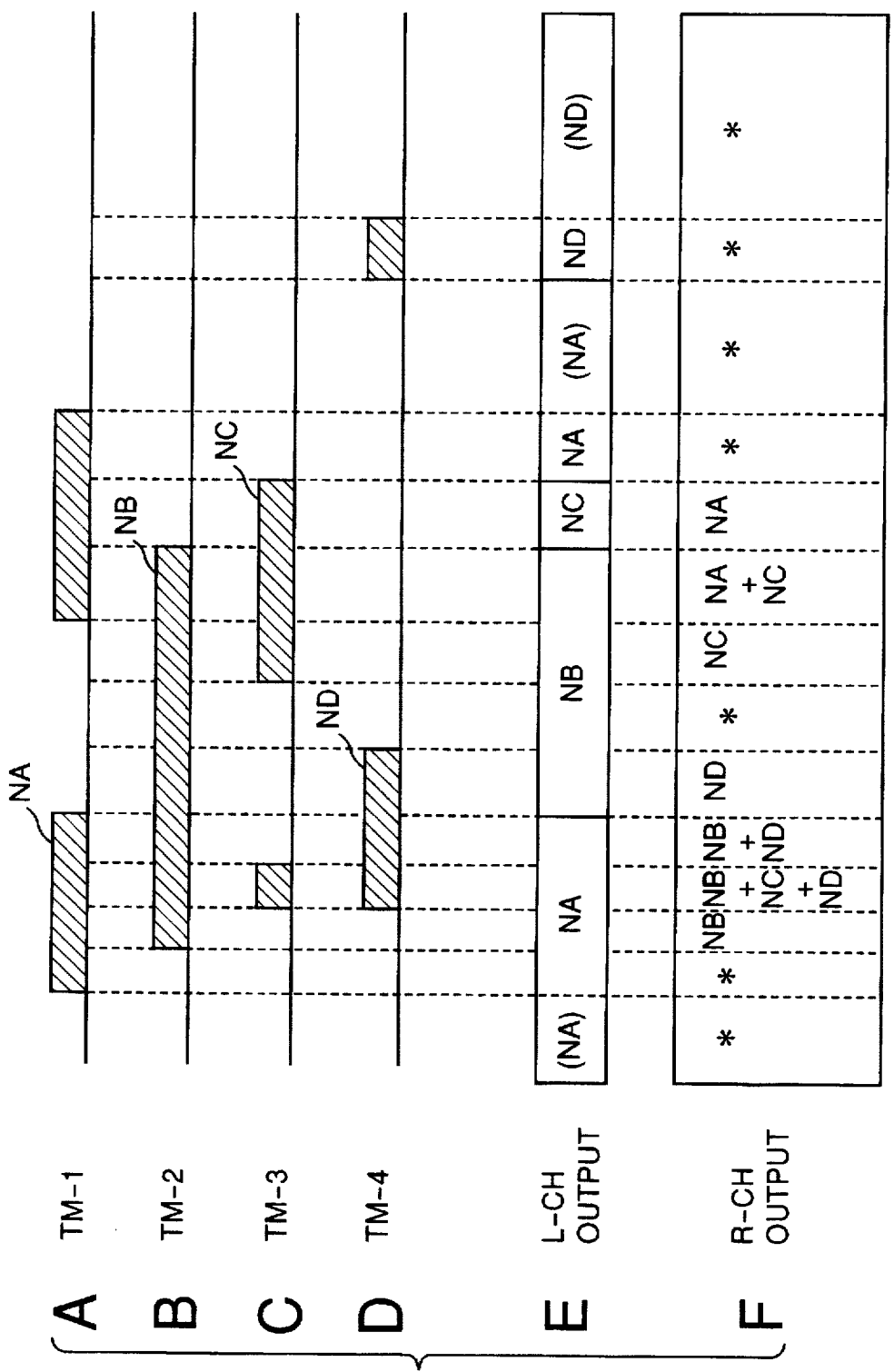
FIG. 12 is a timing chart for explaining a first principal speaker identifying method and an example of the operation in FIG. 11.

FIG. 12 shows, by way of example, the principal speaker determination scheme in the signal processing control part 20 and the scheme of generating left- and right-channel mixed audio signals in the audio signal processing part 25. The principal speaker determining scheme shown in FIG. 12 is one wherein "of terminals judged to be in utterance at a certain time, the terminal first recognized to be in utterance is regarded as that of the principal speaker terminal as long as the speaking state lasts."

When only one terminal is in the utterance, this terminal is decided to be the principal speaker, whereas when a plurality of terminals are simultaneously judged to be in utterance, that one of the terminals which became in utterance earlier than the others is judged to be that of principal speaker at the point when the principal speaker until then became Out of utterance or in silence. In FIG. 12 Rows A to D respectively show the utterance periods NA, NB, NC and ND of the speakers at the terminals TM-1 to TM-4 as diagonally shaded areas. Row E shows the originations of left-channel utterance and Row F the originations of right-channel utterance. The sound is produced by mixing together the audio signals originated from those participants other than the principal speaker.

Figure 13:
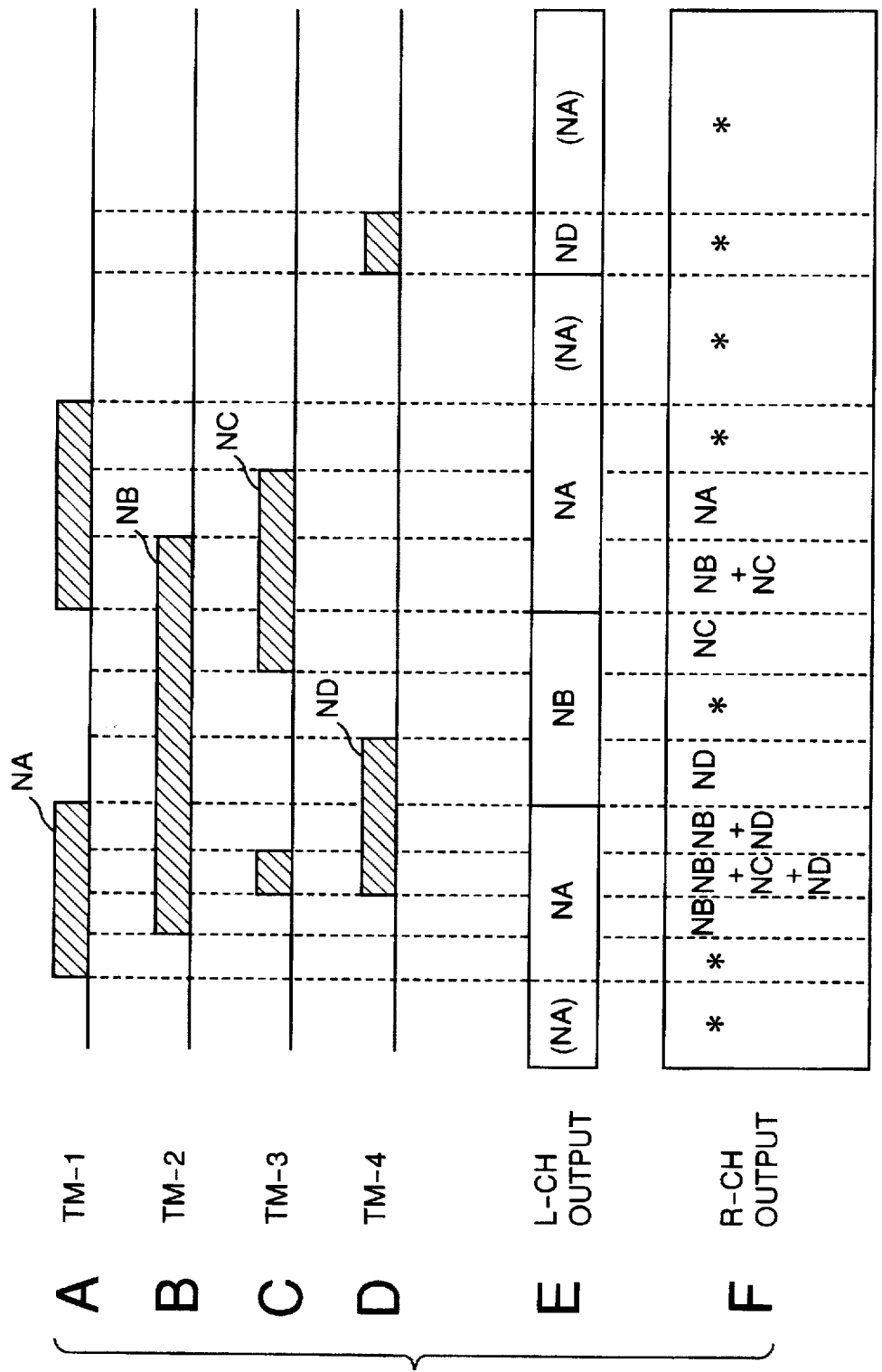
FIG. 13 is a timing chart for explaining a second principal speaker identifying method and another example of the operation in FIG. 11.

FIG. 13 shows other examples of the principal speaker determining scheme in the signal processing Control part 20 and the scheme of generating left- and right-channel mixed audio signals by the audio signal processing part 25 in FIG. 11. In the FIG. 13 example a particular terminal (TM-1 in this case) is given preference on the right to speak. This control scheme corresponds to the prevailing custom of giving the chairperson or lecturer preference on the right to speak. In FIG. 13 Rows A to D show the components of the sound, NA to ND, at the terminals TM-1 to TM-4, Row E the contents of the left-channel audio signals and Row F how the right-channel audio signals are mixed.

There are cases where the two identification schemes described previously with respect to FIG. 9 are also appropriate or inappropriate according to the type of the conference. For example, when participants at multiple terminals conduct free discussion on equal terms, the first identification scheme is preferable in which the principal speaker is expected to be changed quickly. When participants speak by turns, the second identification scheme is favorable in which an undesired change of principal speakers is expected to occur.

Accordingly, it is effective to provide the signal processing control part 20 with means that has algorithms for detection of principal speaker such as exemplified in FIGS. 9, 12 and 13 and switches the control algorithms through manipulation from the terminals TM-1 to TM-M as the conference proceeds.

The speaker selecting part 24 is provided when the sound image control parameters are set in the audio signal processing part 25 described later in respect of FIG. 10. In the case where in the audio signal processing part 25 of FIG. 10 the audio signals of any pair of left and right branched channels $B_{jL}$ and $B_{jR}$ can be set to be either in-phase or 180 degrees out-of-phase with each other and the attenuation factor can be set at 1 to $1/N^{1/2}$ for any speech selected channel $A_j$, the speaker selecting part 24 is dispensable with setting the sound image control parameters for the input channel of the audio signal originated from the principal speaker and for the other channels in the parameter setting part 14C in the same relation as that between the parameter for the principal speaker's channel (selected audio signal channel $A_1$) and the parameters for the other selected audio signal channels $A_2$ to $A_N$ in FIG. 10. Similarly, when the attenuation factor for each branched channel can selectively set to any of 0, $1/N^{1/2}$ and $1/\infty$ in the parameter setting part 14C, the speaker selecting part 24 is unnecessary.

Figure 18:
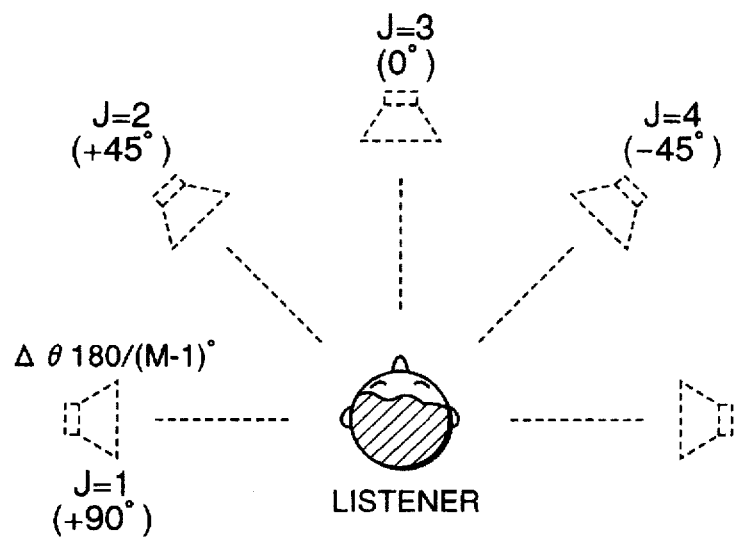
FIG. 18 is a diagram for explaining target positions for sound localization.

FIGS. 10 and 11 show the case where the phases of the audio signals between the left and right branched channels are controlled so that the sound image produced by the audio signal originated from the principal speaker can be distinguished from the sound images produced by the audio signals originated from other speakers and where the distribution of the audio signals to the left and right channels are distinguished for the same purpose. In these cases, the reproducing parts 53L and 53R used at each terminal are loudspeakers placed in front of the listener on the left and right. As the sound image control parameter in the signal processing parts 4-1L to 4-NL and 4-1R to 4-NR, the phase or attenuation can be replaced with left and right acoustic transfer functions described later herein with respect to FIG. 18. Such an instance is subject to headsets to be used as the reproducing parts 53L and 53R at all terminals.

SECOND EMBODIMENT

Figure 14:
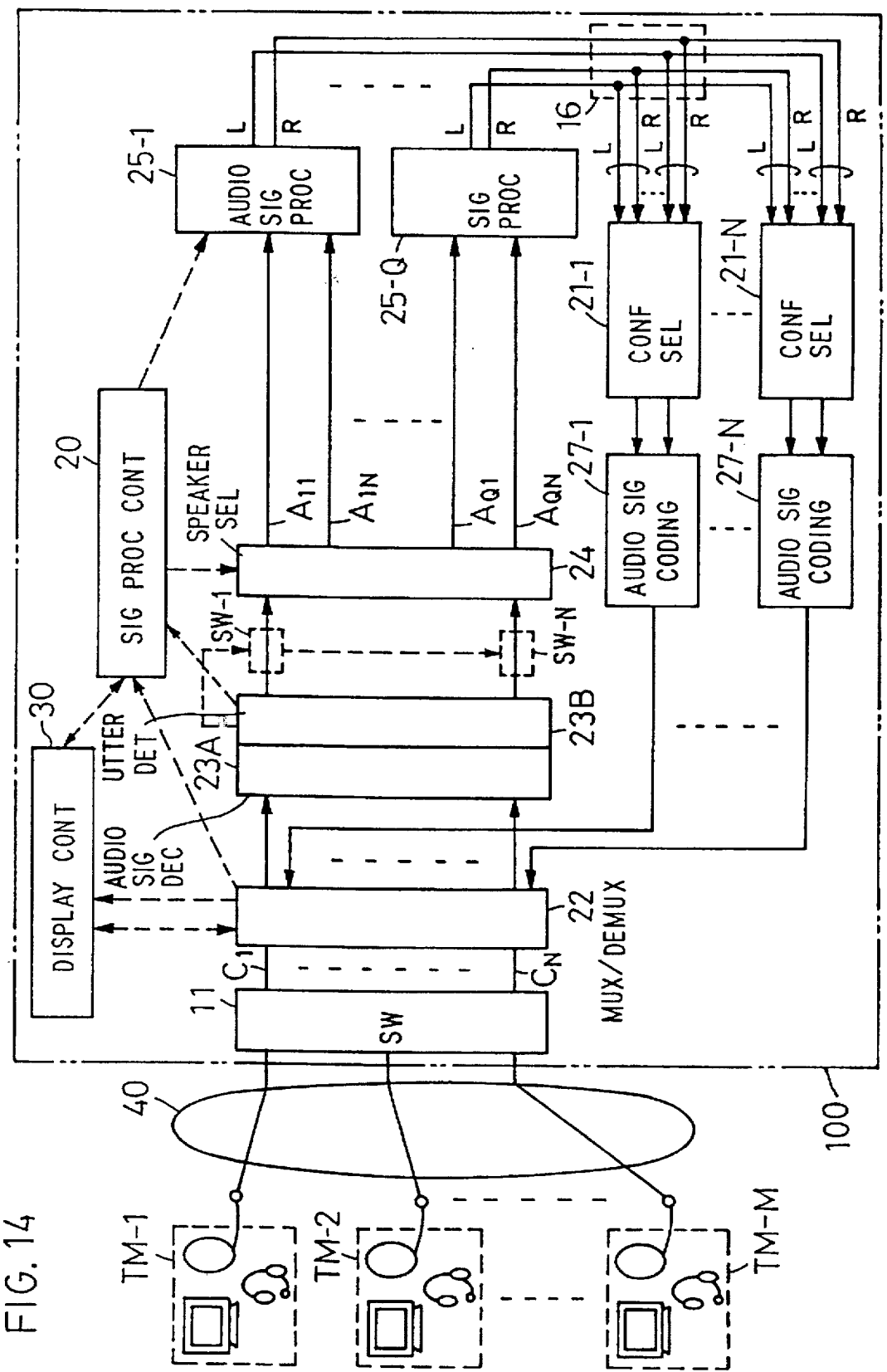
FIG. 14 is a block diagram illustrating a second embodiment of the audio communication control unit according to the present invention.

In FIG. 14 there is illustrated a modified form of the FIG. 8 embodiment in which the user at each terminal is allowed to participate in multiple conferences. In the FIG. 14 embodiment, Q audio signal processing parts 25-1 to 25-P are provided corresponding to Q conferences and terminal-associated mixing control parts 21-1 to 21-M are provided corresponding to the terminals TM-1 to TM-N, respectively, which allow to hold multiple conferences and enable each terminal to take part in two or more of the conferences.

The conference participant instructs the speaker selecting part 24 of the audio communication control unit 100 to select one or more conferences which he wants to attend. When designating multiple conferences, the participant is required to specify one principal conference to which his sound is mixed. Therefore, only one conference is determined for which the audio signal from that terminal is processed for mixing. As for the other designated conferences, the audio signal from that terminal is not mixed and the participant only listens to mixed sounds from other participants in those conferences.

Supposing that one of the logical conferences is a dialog among two or more specific members of the conference as shown in FIG. 14, the participant at one terminal can talk with a particular member while at the same time listening to sound of other participants in the conference—this enables all the conference participants to have natural dialog as if they are physically sitting in the same conference room. In the FIG. 14 embodiment, the speaker selecting part 24 has its internal structure logically divided corresponding to multiple conferences (1 to Q) and performs, for each conference room, the same speaker detection as described previously with respect to FIG. 9.

The FIG. 14 embodiment structurally differs from the FIG. 8 embodiment in that it includes audio signal processing parts 25-1 to 25-Q of the same ;number as that Q of conferences capable of being held; and one of the audio signal processing parts 25-1 to 25-Q is assigned to one logical conference and the terminal-associated mixing control parts 21-1 to 21-M are each provided at the output side of one of the audio signal processing parts 25-1 to 25-P. The audio signal processing part 25-1 to 25-P in this embodiment may be those depicted in FIGS. 10 or 11, for instance.

Figure 15:
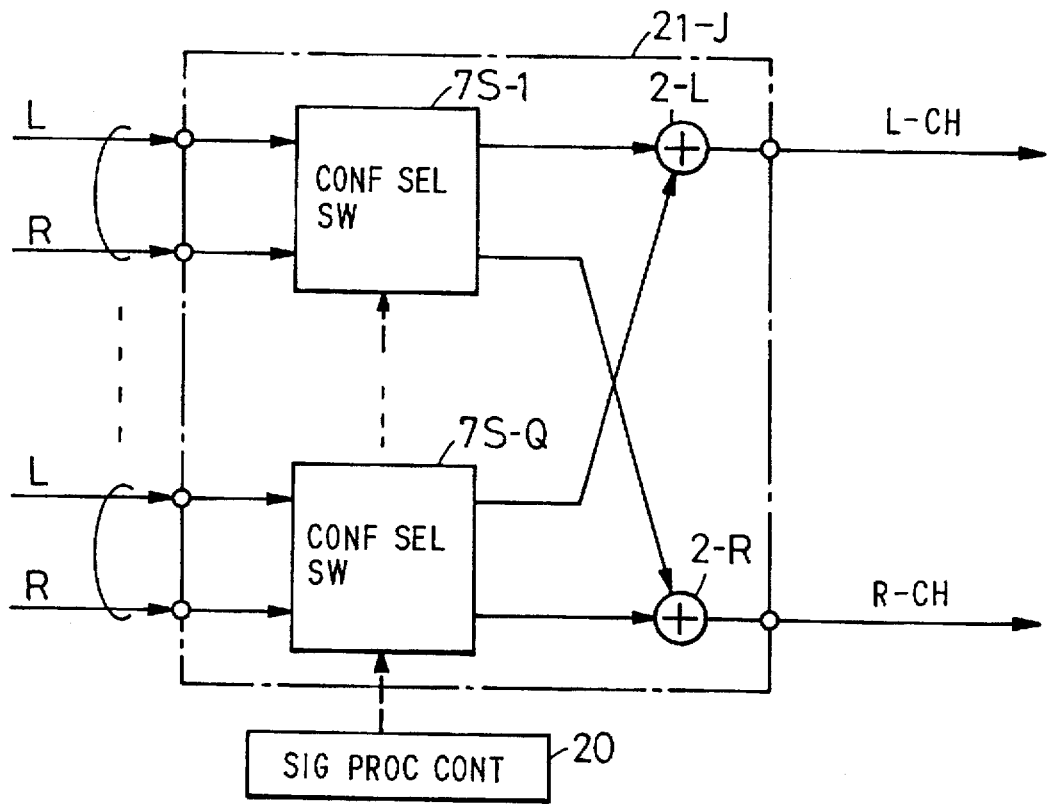
FIG. 15 is a block diagram showing an example of the construction of a terminal-associated mixing control part corresponding to each terminal in FIG. 14.

FIG. 15 schematically illustrates, by way of example, the configuration of that one 21-J of the terminal-associated mixing control parts 21-1 to 21-N which corresponds to the terminal TM-J in the FIG. 14 embodiment. The terminal-associated mixing control part 21-J is composed of: conference selecting switches 7S-1 to 7S-Q which are supplied with left- and right-channel audio signals from the Q signal processing control parts 25-1 to 25-Q; a left-channel mixer 2-L connected to left-channel outputs of all the conference selecting switches 7S-1 to 7S-Q; and a right-channel mixer 2-R connected to right-channel outputs of the conference selecting switches 7S-1 to 7S-Q. In response to a participating conference designating control signal received from the terminal TM-J, the signal processing control part 20 turns ON one or more conference selecting switches ($1 \leq P \leq Q$) corresponding to the designated conferences, thus selecting the designated conferences.

The left and right audio signal outputs from the audio signal processing parts 25-1 to 25-Q corresponding to the conferences 1 to P are branched by the terminal-associated branching part 16 and provided to the conference selecting switches 7S1 to 7S-Q in the terminal-associated mixing control part 21-J. As a result, left- and right-channel audio signals from one or more conferences designated by the terminal TM-J are selected and fed to the left- and right-channel mixers 2-L and 2-R. For example, when the terminal participates in two conferences at the same time, the left-channel audio signals from the two conferences are mixed together by the left-channel mixer 2-L and outputted therefrom as a left-channel audio signal, and the right-channel audio signals from the two conferences are mixed together by the right-channel mixer 5-R and outputted therefrom as a right-channel signal. The left- and right-channel audio signals thus generated are encoded in the corresponding audio signal coding part 27-J in FIG. 14 and sent to the corresponding to the conference participating terminal TM-J, where the mixed speech from the two conferences is reproduced.

Instead of using the conference selecting arrangement that performs the aforementioned terminal-associated conference selection by the conference selecting switches 7S-1 to 7S-Q in FIG. 15, it is also possible to adopt an arrangement in which the terminal-associated branching part 16 is formed by a switch matrix logically having 2Q by (2Q×N) inputs/outputs and ON-OFF control of its contacts is made by the signal processing control part 20 on the basis of a conference selecting command from the terminal to supply the terminal-associated mixing control parts 21-1 to 21-N with only the audio signal of the conference designated by the terminal.

THIRD EMBODIMENT

Figure 16:
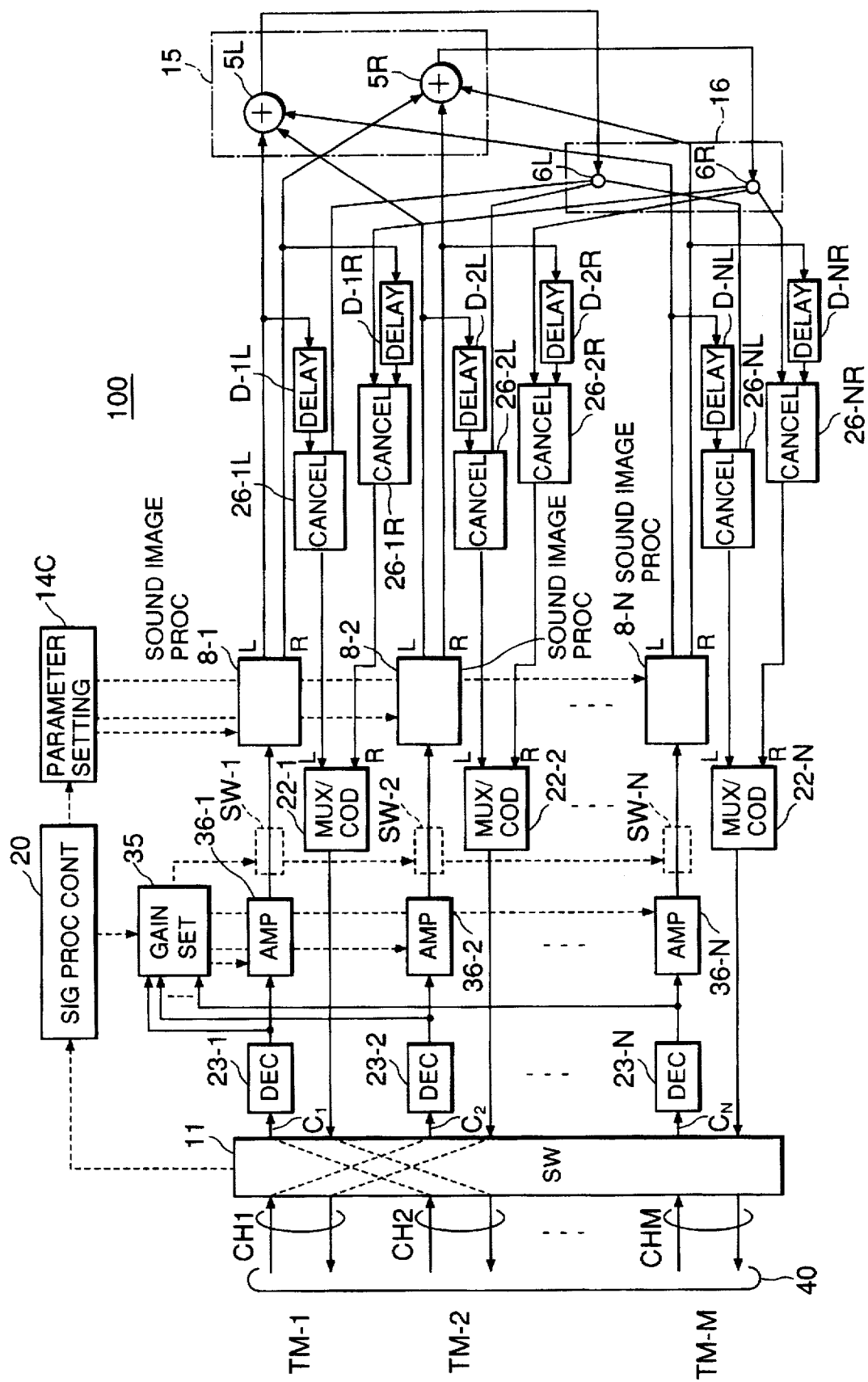
FIG. 16 is a block diagram showing a third embodiment of the audio communication control unit according to the present invention.

In the first embodiment shown in FIGS. 8 and 11, the principal speaker is judged and the audio signal originated from him is assigned to the left channel and other participants' audio signals are mixed and assigned to the right channel. The audio signals from the left and right channels are sent to each participating terminal, where the sound is reproduced using one sound source for each channel. When this system is applied to communications among three or more terminals, audio signals from two points are simultaneously mixed in the right channel, in which case the listener cannot localize their sounds at different positions. Additionally, when the principal speaker changes, the audio signal from each terminal is not always distributed to the same channel, with the result that the listener does not localize each sound component of the same speaker at the same position at all times. This hinders the identification of each speaker and intelligibility. FIG. 16 illustrates an embodiment intended to overcome this defect.

The FIG. 16 embodiment is also based on the basic configuration of the present invention depicted in FIG. 8. The audio communication control unit 100 of FIG. 16 processes audio signals of N participants by using different sets of acoustic transfer functions as the sound image control parameters so that the reproduced sounds of the N participants are localized at different spatial positions. This permits implementation of a teleconference that simultaneously joins a maximum of N terminals where the sounds of the speakers are intended to be localized at different positions. In this instance, however, the terminal requires use of headsets as the reproducing parts 53L and 53R (FIG. 7). The terminal at each point transmits an audio signal of one communication line to the audio communication control unit 100, which, in turn, transmits an audio signal of one communication line back to the terminal at each point. The audio signal conveyed by one communication channel from the audio communication control unit 100 is obtained by multiplexing stereo audio signals of two channels into a one-channel signal.

Figure 1:
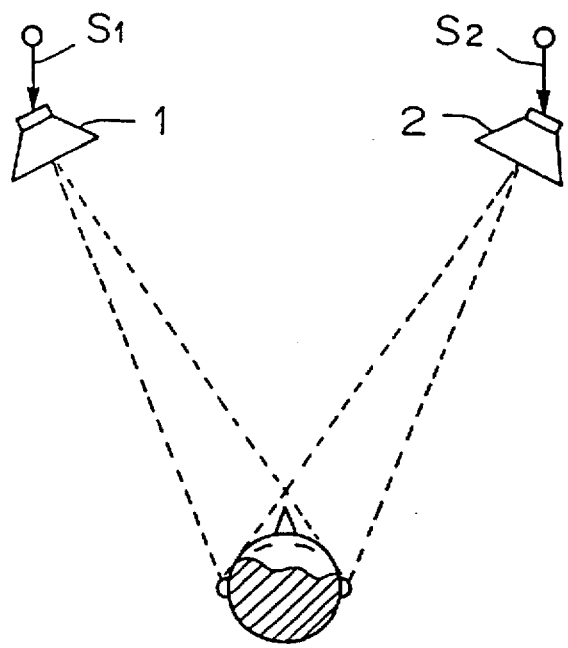
FIG. 1 is a diagram for explaining acoustic transfer functions intended for sound localization.
Figure 2:
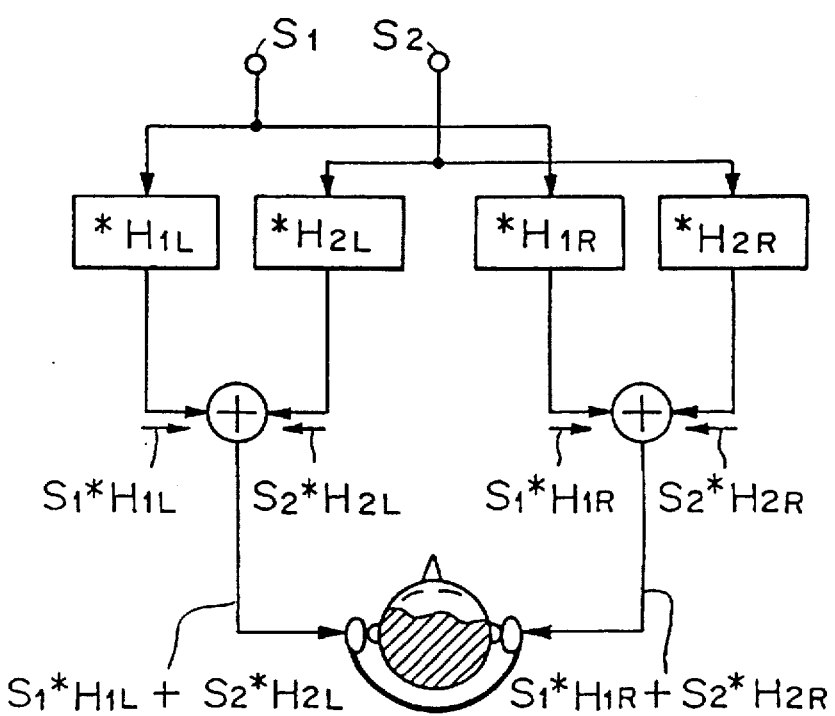
FIG. 2 is a diagram for explaining an example of audio signal processing intended for sound localization.
Figure 3:
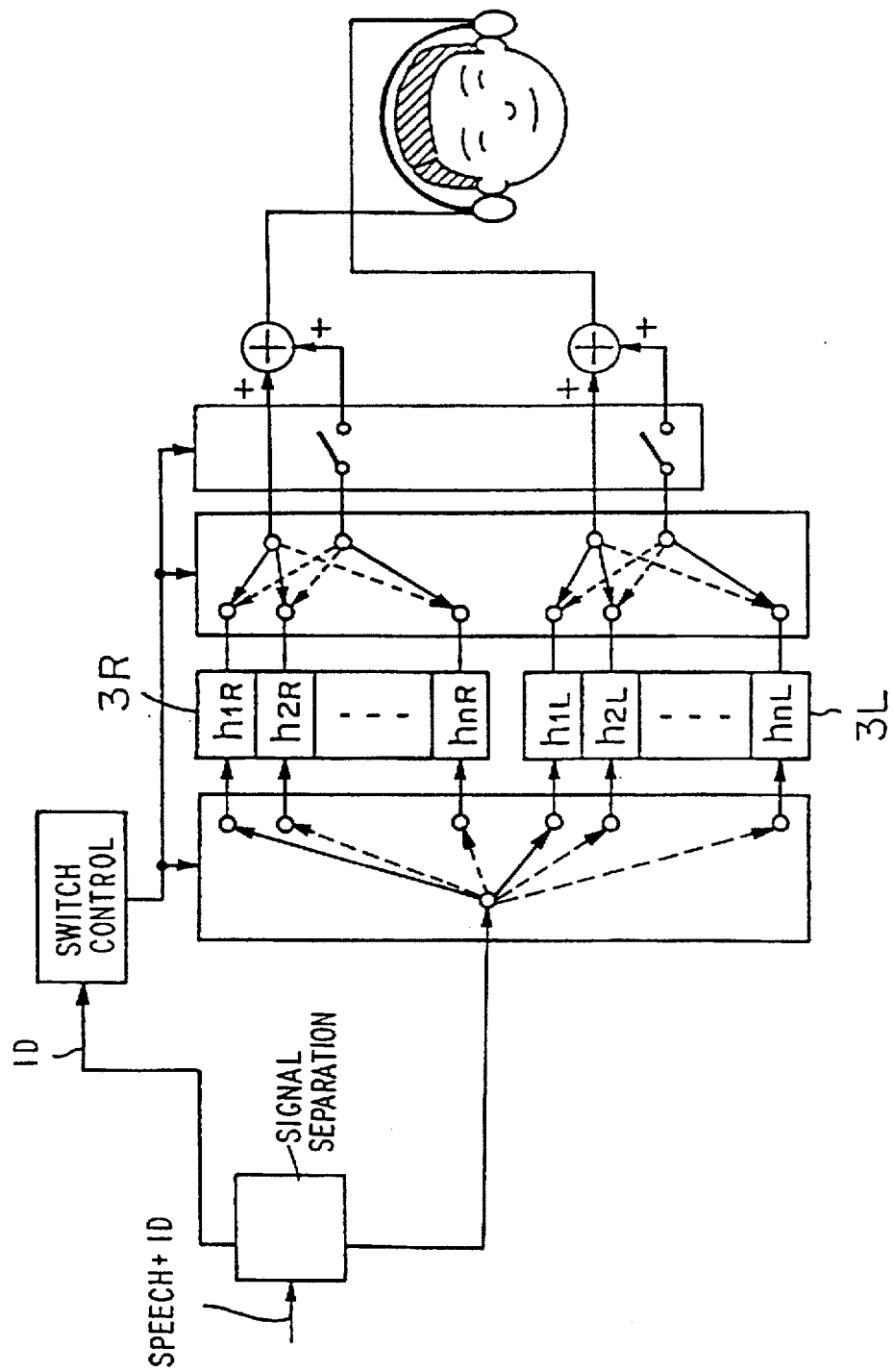
FIG. 3 is a block diagram showing an example of the configuration of a terminal for conventional multi-point audio telecommunication.
Figure 4:
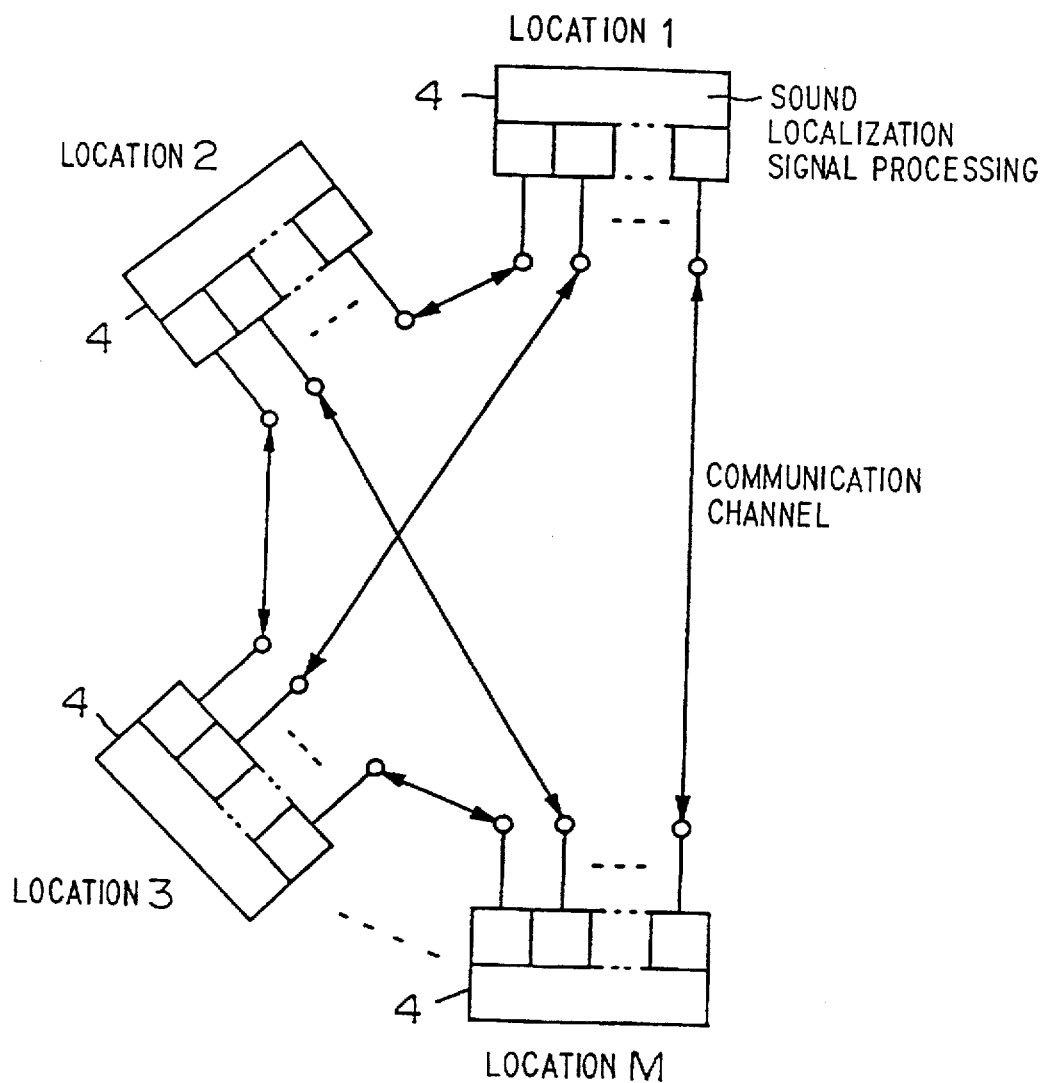
FIG. 4 is a block diagram showing an example of a network arrangement in a conventional multi-point audio telecommunication system.
Figure 17:
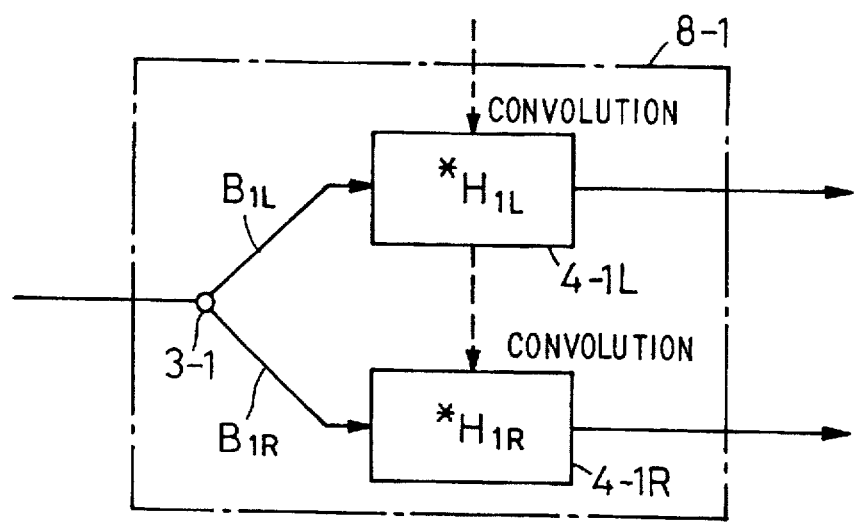
FIG. 17 is a block diagram showing an example of the construction of a sound image processing part 8-1 in FIG. 16.

In this embodiment, the sets of channel branch points 3-1, ..., 3-N of the channel branching part 16 and left and right signal processing parts 4-1L, 4-1R, 4-2L, 4-2R, ..., 4-NL, 4-NR of the sound image control part 14, which correspond to the respective terminals, are shown as sound image processing parts 8-1, 8-2, ..., 8-N, respectively. In FIG. 17 there is illustrated, by way of example, the sound image processing part 8-1. Based on the principle described previously with respect to FIG. 2, the sound image processing part 8-1 convolves, by convolvers 4-1L and 4-1R, acoustic transfer functions $H_{1L}$ and $H_{1R}$ into left and right audio signals branched at the channel branch point 3-1, respectively. The audio Signals resulting from the convolution are applied as left- and right-channel audio signals to the mixers 5L and 5R of the mixing part 15 in FIG. 16. The transfer functions $H_{1L}$ and $H_{1R}$, which are convolved with the branched audio signals of the respective channels, can be determined corresponding to the spatial positions desired to localize reproduced sounds of the audio signals.

The switching part 11 selects J (where $1 \leq J \leq M$) communication lines from an unspecified number of communication lines 40 forming a communication circuit network, where M represents the number of terminals simultaneously connected to the network and usually $M \leq N$. Every selected communication line is connected as two channels for each one of terminals that simultaneously conduct audio communication. One of the two channels carries the input audio signal in this example and is connected to a decoding part 23-J (where J=1, 2, ..., N). The other channel carries the output audio signal and is connected to a multiplexing part 22-J via the input channel $C_J$. Each decoding part 23-J decodes the audio signal inputted thereto from the terminal connected thereto. The audio signal decoded in the decoding part 23-J is applied to an amplification factor setting part 35 and an amplifier 36-J.

The signal processing control part 20 receives a connection confirm signal and similar control signals that are transmitted from the respective terminals via the switching part 11. The signal processing control part 20 detects the number M of connected terminals from such control signals and sends the detected number M of connected terminals to the amplification factor setting part 35 and the parameter setting part 14C. The amplifier 36-J amplifies the input audio signal with an amplification factor $G_J$, which is determined in the amplification factor setting part 35. For example, the amplification factor $G_J$ is determined such that the integrated power IT of the audio signal from the amplifier 36-J is equal for any channels.

The parameter setting part 14C sets acoustic transfer function $H_{JL}(\theta_J)$ and $H_{JR}(\theta_J)$ necessary for the sound image processing part 8-J to synthesize an audio signal for localization of the reproduced sound originated from the terminal TM-J of each point J at a different target position $\theta_J$. The target positions $\theta_J$ and the acoustic transfer functions $H_{JL}(\theta_J)$ and $H_{JR}(\theta_J)$ have a one-to-one correspondence; hence, once the target position $\theta_J$ is determined for each input signal, the acoustic transfer functions $H_{JL}(\theta_J)$ and $H_{JR}(\theta_J)$ can be determined which are convolved with each audio signal. In this example, the target positions $\theta_J$ for the audio signals from respective terminals are determined on the basis of the number M of connected terminals. As exemplified in FIG. 18 wherein M=5, the target positions $\theta_J$ are determined at equiangular intervals of $\Delta\theta=180/(M-1)$ degrees about the listener over at angular positions (+90°)-(0°)-(-90°) from his left to right side in a horizontal plane. The target positions $\theta_J$ for the terminals TM-J at the respective points J are determined by $90-180(J-1)/(M-1)$ degrees according to the number M of connected terminals. Therefore, the target position spacing $\Delta\theta$ is minimum in the case of using the maximum number N of connectable points (M=N).

In the sound image processing part 8-J, as described previously with respect to FIG. 17, the transfer functions $H_{JL}(\theta_J)$ and $H_{JR}(\theta_J)$ set by the parameter setting part 14C are convolved with the audio signal from the amplifier 36-J, and the convolved outputs are applied as left- and right-channel audio signals to the mixers 5L and 5R, respectively. In the case of binaural listening to these left- and right-channel audio signals by use of a headset, the listener can localize the sound image at the target position $\theta_J$. The left- and right-channel audio signals from the sound image processing part 8-J are also provided to delay parts D-JL and D-JR, respectively.

The mixer 5L mixes together all the left-channel audio signals fed from the sound image processing parts 8-1 to 8-N and applies the resulting left-channel mixed audio signal to a branch point 6L in the branching part 16. The mixer 5R mixes together all the right-channel audio signals fed from the sound image processing parts 8-1 to 8-N and applies the resulting right-channel mixed audio signal to a branch point 6R. The branch point 6L branches the left-Channel mixed audio signal fed from the mixer 5L to N cancelers 26-1L to 26-NL. The branch point 6R branches the right-channel mixed audio signal fed from the mixer 5R to N cancelers 26-1R to 26-NR.

On the other hand, the left-channel audio signal applied to each delay part D-JL is delayed for a time $\tau_{JL}$ and provided to the canceler 26-JL. The delay $\tau_{JL}$ is set to the sum of the delay by the audio signal processing in the mixer 5L and the delay by the audio signal processing at the branch point 6L. Consequently, the left-channel audio signal outputted from the delay part D-JL and that component of the left-channel mixed audio signal outputted from the branch point 6L which was applied to the mixer 5L from the sound image processing part 8-J become in-phase and they cancel each other in the canceler 26-JL. Accordingly, the audio signal component received from the terminal TM-J at each point J is eliminated from the left-channel mixed audio signal to be branched to the terminal TM-J and hence an echo can be prevented. Accordingly, the audio signal that is sent back to the terminal TM-J via the canceler 26-JL is only a mixed version of audio signals from the terminals other than TM-J. For the same reason as given above, the delay part D-JR delays the right-channel audio signal from the sound processing part 8-J for a time $\tau_{JR}$ and then applies it to the canceler 26-JR. The delay $\tau_{JR}$ is set to the sum of the delay by the audio signal processing in the mixer 5R and the delay by the audio signal processing at the branch 6R.

The echo-suppressed left- and right-channel audio signals outputted from the cancelers 26-JL and 26-JR are provided to the multiplexing part 22-J, wherein they are multiplexed and encoded, thereafter being sent via the switching part 11 to the terminals TM-J at the points J. In this way, each multiplexing part 22-J multiplexes audio signals of the left and right channels into a one-channel audio signal and encodes it. As a result, the multiplexed one-channel audio signal is encoded and then transmitted via the switching part 11 to the points J ($1 \leq J \leq M$) over one communication line. Thus the delay difference between the communication lines by the use of two lines for the transmission of two-channel stereo signals can be avoided, and the number of communication lines used can be saved. By decoding the multiplexed audio signal and reproducing the sounds at each terminal, the listener at that terminal can localize the sounds from other terminals at desired target positions $\theta_j$. This enables each listener to easily identify the other speakers and ensures high speech intelligibility. Additionally, no sound image position processing means is needed for the sound localization at each point and an economical system can be implemented.

Incidentally, the FIG. 16 embodiment is based on the assumption that two communication lines are used for the transmission of the two-channel stereo audio signals to each of the points J ($1 \leq J \leq M$) from the audio communication control unit 100. In such an instance, one communication line is used for each of the left- and right-channel audio signals and the switching part 11 needs to perform three-switching for each point J. Further, the multiplexing and demultiplexing in the multiplexing part 22-J and at each point in FIG. 16 become unnecessary, but two coding parts 22-JL and 22-JR are needed for each terminal as a substitute for one multiplexing part 22-J. It is also necessary to connect the cancelers 26-JL and 26-JR to the inputs of the coding parts 22-JL and 22-JR for inputting thereinto audio signals.

As described above, according to the embodiment of FIG. 16, the listener at each terminal can localize sounds from other terminals at different position and hence can easily listen to them even if the terminal is not provided with the audio signal processing part intended for sound localization. Thus the listener at each point can easily identify the speaker and excellent intelligibility can be obtained. Moreover, there is no need of predetermining the communication system.

As referred to above, in binaural listening over a headset or the like, too, it is possible to implement an economical multi-point audio telecommunication system in which the listener localizes sound from each speaker at a different position. When the number M of connected terminals is smaller than the maximum number N of connectable terminals, spacing of target positions can be increased accordingly.

FOURTH EMBODIMENT

Figure 19:
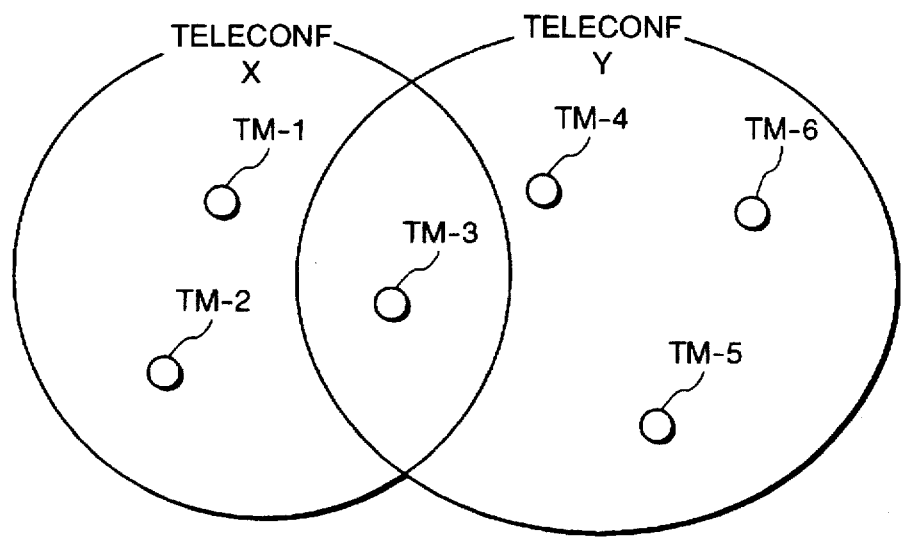
FIG. 19 is a diagram for explaining combinations of terminals belonging to one or more teleconferences.

Now, consider the case where terminals TM-1 to TM-6 at different points communicate with one another via the audio communication control unit as shown in FIG. 19. Let it be assumed that combinations of terminals TM-1 to TM-3 and TM-3 to TM-6 form teleconferences X and Y, respectively. In this case, users of the terminals TM-4 to TM-6 cannot listen to sounds of users at the terminals TM-1 and TM-2, and the users at the terminals TM-1 and TM-2 cannot listen to sounds of the users at the terminals TM-4 to TM-6. The user of the terminal TM-3 can listen to sound of the user at any of the terminals TM-1, TM-2 and TM-4 to TM-6, and all the users' at the terminals TM-1, TM-2 and TM-4 to TM-6 can listen to sound of the user at the terminal TM-3. With this method, the contents of communication can be concealed from users who do not belong to the teleconference concerned or the user belonging to multiple teleconferences can be made to recognize the contents of communication in any one of the conferences, and various other applications are feasible. Besides, by listening to sounds of individual speakers while localizing their sound images at different positions, the listener can easily identify the speakers and understand the contents with high intelligibility; furthermore, it can be expected that the listener and the speakers develop better communication with each other as if they are in the same space.

With the audio communication control unit shown in FIGS. 14 and 15, however, the user at the terminal TM-3 can select both teleconferences X and Y and simultaneously listen to sounds in both conferences but he is allowed to speak in only his selected one of the conferences X and Y. When the user at the terminal TM-3 listens to sounds from both conferences X and Y at the same time, the sounds received from the conferences are separately reproduced from left and right loudspeakers but sounds from multiple terminals in the sounds from the teleconference X or Y cannot be localized at different positions.

Figure 20:
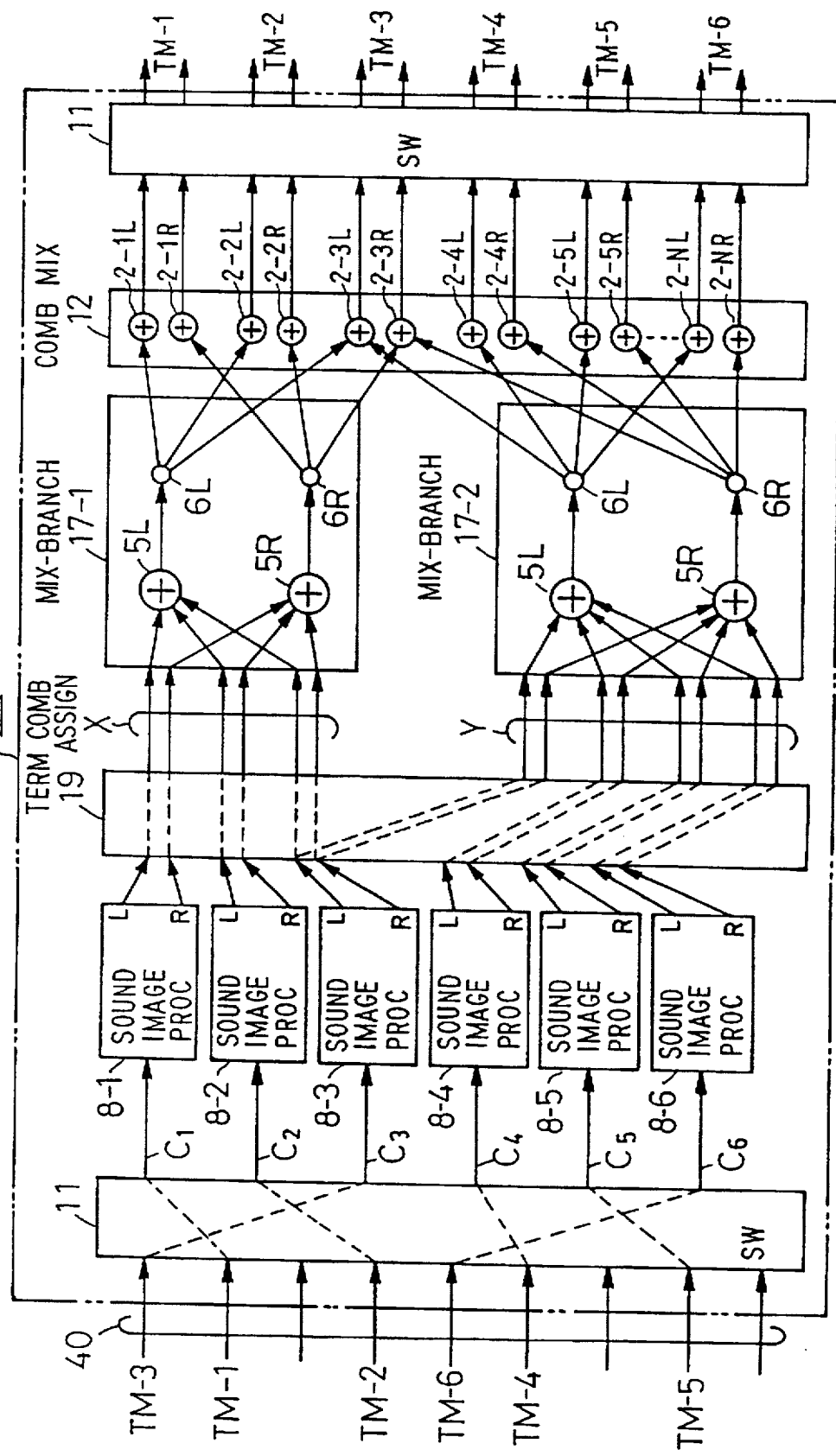
FIG. 20 is a block diagram illustrating a fourth embodiment of the audio communication control unit according to the present invention.

In FIG. 20 there is illustrated the basic configuration of a fourth embodiment of the audio communication control unit of the present invention intended to overcome the disadvantage mentioned above. The main arrangement of the audio communication control unit of this embodiment can be formed by: the switching part 11; the sound image processing parts 8-J (J=1, 2, ..., N, where N=6 in this example), each of which performs speech processing for localizing the position of the speaker's sound source by convolving transfer functions from the sound source to listener's both ears with the audio signal sent from one of the terminals TM-1 to TM-6; a combination assignment part 19 for assigning combinations of terminals in correspondence with multiple teleconferences; an mixing/branching parts 17-P (P=1, 2, ..., Q, where Q=2 in this example); and a mixing part 12. Each mixing/branching part 17-P is composed of the left- and right-channel mixers 5L and 5R and the branch points 6L and 6R. The mixing part 12 comprises N left- and N right-channel mixers 2-JL and 2-JR (J=1, 2, ..., where N=6 in this example). The components of the same kind are specified by suffixes J ($1 \leq J \leq N$) and P ($1 \leq P \leq Q$). The components for processing the audio signals of the left and right channels are similarly identified by suffixes L and R, respectively.

The operation of the audio communication control unit according to this embodiment will be described. The switching part 11 selects a communication line J ($1 \leq J \leq M$) from among an unspecified number of lines forming the circuit network, M representing the number of terminals connected to the network at the same time. Usually, $M \leq N$, where N represents the maximum number of connectable terminals. In response to a communication start/end, terminal designate, connection confirmation or similar control signal received from one terminal, for instance, the switching part 11 selects the communication line J and couples it to the sound image processing part 8-J via the input channel $C_J$ in this example. The sound image processing part 8-J is identical in construction to that depicted in FIG. 17 and corresponds to a set of one branch point 3-J and left- and right-channel signal processing parts 4-JL and 4-JR in FIG. 6.

The sound image processing part 8-J performs processing for localization of sound originated from the terminal TM-J at a target position by convolving the transfer function with the audio signal sent from the terminal TM-J. Hence the audio signal that is outputted from the sound image processing part 8-J is a stereo audio signal. The stereo audio signals generated by the respective sound image processing parts 8-J are applied to the combination assignment part 19, wherein they are sorted for each combination of terminals. In the illustrated example, the terminals TM-1 to TM-3 and TM-3 to TM-6 are shown to belong to the teleconferences X and Y, respectively, as depicted in FIG. 19.

The stereo audio signals, classified by the combination assignment part 19 into those belonging to the conference X and those belonging to the conference Y, are fed to the mixing/branching parts 17-1 and 17-2, respectively, wherein the audio signals from the terminals belonging to the same conference are mixed by the mixer 5L or 5R for each of the left and right channels. The mixed audio signals of the teleconference X (and the teleconference Y) are distributed by the left and right branch points 6L and 6R in the mixing/branching part 17-1 to left- and right-channel mixers 2-1L to 2-3L and 2-1R to 2-3R in the mixing part 12 that correspond to all the terminals TM-1 to TM-3 belonging to the same teleconference X. Similarly, the mixed audio signals of the teleconference Y are distributed by the left- and right-channel branch points 6L and 6R in the mixing/branching part 17-2 to left- and right-channel mixers 2-3L to 2-6L and 2-3R to 2-6R in the mixing/branching part 17-2 that correspond to all the terminals TM-3 to TM-6 belonging to the same teleconference Y. Each pair of mixers 2-JL and 2-JR mixes, for each channel, all audio signals of the teleconference to which the pair belongs, thereby generating stereo audio signals. The stereo audio signals thus obtained are transmitted via the switching part 11 to those of the terminals TM-1 to TM-6 which correspond to the teleconference.

Figure 21A:
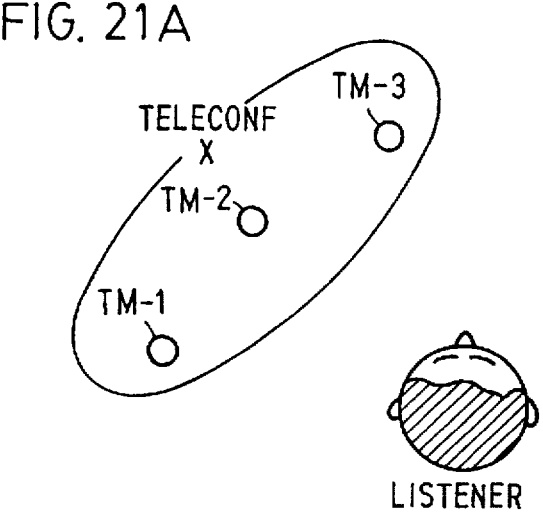
FIG. 21A is a diagram showing an example of target positions for sound localization in one teleconference by the embodiment of FIG. 20.
Figure 21B:
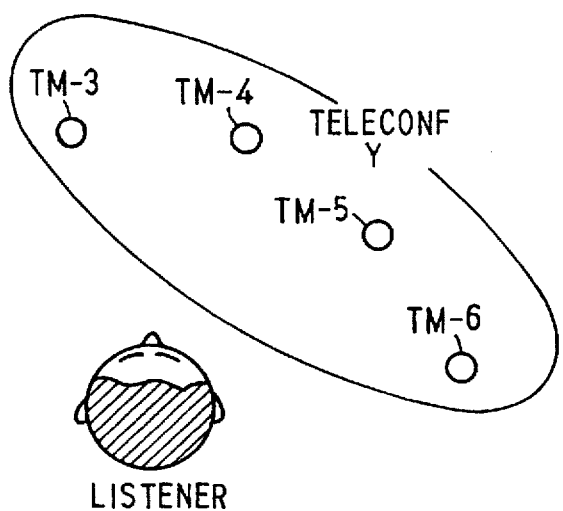
FIG. 21B is a diagram showing an example of target positions for sound localization in another teleconference by the embodiment of FIG. 20.
Figure 21C:
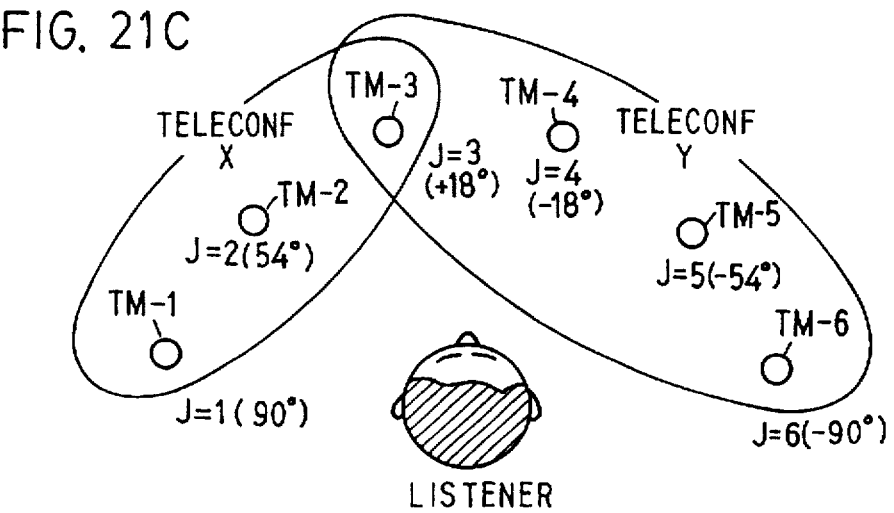
FIG. 21C is a diagram showing target positions for sound localization in two teleconferences by the embodiment of FIG. 20.

In this example, the audio signals that are sent to the terminals TM-1 to TM-6 are stereo audio signals and the user of each terminal can listen to sounds originated from the other terminals, localizing them at target positions determined by the transfer functions convolved with the audio signals in the sound image processing parts 8-J as shown in FIGS. 21A and 21B. That is, since in the embodiment of FIG. 20 the audio signals originated from the terminals TM-1 to TM-3 are convolved with the transfer functions, mixed with one another for each channel and then transmitted to the terminals TM-1 to TM-3, only the users at these terminals can listen to the sounds originated from the terminals TM-1 to TM-3, localizing their sounds at target positions corresponding to the transfer functions convolved with the audio signals in the sound image processing parts as shown in FIG. 21A. The teleconference formed by this combination of terminals will hereinafter be identified as a teleconference X. Likewise, transfer functions are convolved with the audio signals originated from the terminals TM-3 to TM-6 and the audio signals are mixed with one another for each channel and sent to the terminals TM-3 to TM-6; hence, the listeners of these terminals can listen to the sounds originated from the terminals TM-3 to TM-6, localizing their sounds at target positions corresponding to the transfer functions convolved with the audio signals in the sound image processing parts as shown in FIG. 21B. The teleconference formed by this combination of terminals will hereinafter be identified as a teleconference Y. In this instance, since the user of the terminal TM-3 belongs to both of the teleconferences X and Y, he can listen to sounds originated from all the terminals TM-1 to TM-6 of both teleconferences X and Y, localizing their sounds at different target positions as depicted in FIG. 21C.

FIFTH EMBODIMENT

A description will be given, with reference to FIGS. 22 and 23, of a concrete example of the audio communication control unit 100 of the basic configuration shown in FIG. 20. Suppose that the audio communication control unit 100 of this embodiment transmits audio signals between it and each of the terminals over a pair of down- and up-link communication lines. The audio communication control unit 100 of this embodiment controls a maximum of Q teleconferences formed by a maximum of N terminals. Each terminal sends a one-channel digital audio signal to the audio communication control unit 100, which, in turn, sends a one-channel digital audio signal to each terminal. The one-channel audio signal from the audio communication control unit 100 is a one-channel multiplexed version of stereo signals of two channels generated in the unit 100.

Since in FIG. 20 the switching part 11, the decoding part 23-J (J=1, 2, . . . , N), the signal processing part 20, the amplification factor setting part 35, the amplifier 6-J (J=1, . . . , N), the parameter setting part 14C, the sound image processing part 8-J (J=1, . . . , N) and the multiplexing/coding part 22-J (J=1, . . . , N) are identical in construction and operation to those in the FIG. 16 embodiment, no description will be repeated. This embodiment differs from the FIG. 16 embodiment in the provision of the combination assignment part 19, a conference participating terminal selecting part 9C, a mixing/branching part 17-P (P=1, . . . , Q), a conference selecting part 7C, a conference selecting switch 7-P (P=1, . . . , Q) and a mixing part 12. The combination assignment part 19 has Q by N terminal selecting switches 9P-J (P=1, . . . , Q and J=1, . . . , N), and the mixing part 12 has N pairs of mixers 2-JL and 2-JR (J=1, . . . , N).

Figure 23:
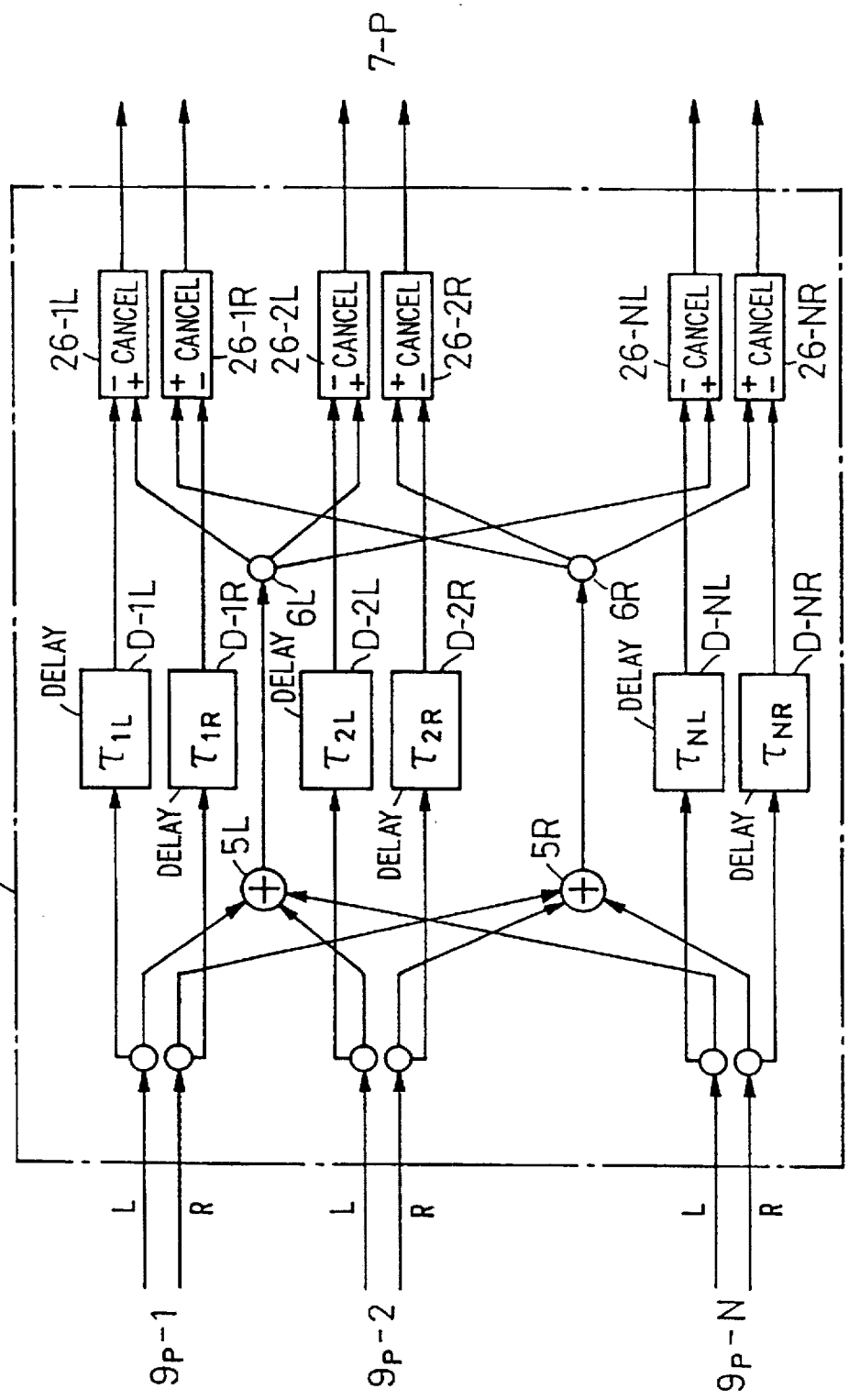
FIG. 23 is a block diagram showing an example of the construction of each mixing/branching part 17-P in FIG. 22.

As depicted in FIG. 23, the mixing/branching part 17-P is made up of mixers 5L and 5R, branch points 6L and 6R, delay parts D-JL and D-JR (J=1, . . . , N) and cancelers 26-JL and 26-JR (J=1, . . . , N). The functions of the parts characteristic of this embodiment will be described below. As described previously with respect to FIG. 16, the audio signal from each terminal is provided to the sound image processing part 8-J via the decoding part 32-J and the amplifier 36-J.

The signal processing control part 20 receives from each terminal via the switching part 11 control signals as to communication start/end, connection confirmation, the conference membership of the terminal and so forth. Based on these control signals, the signal processing control part 20 detects the number M of connected terminals TM-1 to TM-n, their communication start/end and their conference membership. The signal processing control part 20 sends information of the connected terminals and the number M of connected terminals to the amplification factor setting part 35 and the parameter setting part 14C, sends the communication start/end information to the conference participating terminal selecting part 9C and the conference selecting part 7C, and sends information of the conference membership of each of the connected terminals TM-1 to TM-n to the conference participating terminal selecting part 9C.

The parameter setting part 14C sets acoustic transfer functions $H_L(\theta_J)$ and $H_R(\theta_J)$ necessary for the sound image processing part 8-J to perform processing for generating an audio signal whose reproduced sound originated from each terminal TM-J is localized at a different target position $\theta_J$. Since the target positions $\theta_J$ and the acoustic transfer functions $H_L(\theta_J)$ and $H_R(\theta_J)$ have a one-to-one correspondence, the acoustic transfer functions can be set once the target positions are determined. In this embodiment, based on the number M of connected terminals, the target positions $\theta_J$ for the sounds originated from the respective terminals are determined. As shown in FIG. 21C, the target positions $\theta_J$ are determined at equiangular intervals of 180/(M−1) degrees about the listener over at angular positions (+90°)-(0°)-(−90°) from his left- to right side in a horizontal plane. That is, the target positions $\theta_J$ for the points J are determined by 90−180(J−1)/(M−1) degrees.

Since M=6 in the example of FIG. 21C, the target positions $\theta_J$ for the terminals TM-1 to TM-6 are as follows:

$\theta_{J=1}=90°-180°×(1-1)/(6-1)=+90°$ $\theta_{J=2}=90°-180°×(2-1)/(6-1)=+54°$ $\theta_{J=3}=90°-180°×(3-1)/(6-1)=+18°$ $\theta_{J=4}=90°-180°×(4-1)/(6-1)=-18°$ $\theta_{J=5}=90°-180°×(5-1)/(6-1)=-54°$ $\theta_{J=6}=90°-180°×(6-1)/(6-1)=-90°$ The sound image processing part 8-J convolves the acoustic transfer functions $H_L(\theta_J)$ and $H_R(\theta_J)$, set in the parameter setting part 14C for the terminal TM-J, with the audio signal fed from the amplifier 36-J, generating left- and right-channel stereo audio signals. Listening to sounds reproduced from the stereo audio signals binaurally, the listener localizes the sound image at the target position $\theta_J$.

The left- and right-channel audio signals from the sound image processing part 80J are distributed to the Q terminal selecting switches $9_1$-J, $9_2$-J, . . . , $9_Q$-J. Based on the control information about communication start/end and the communication conference membership of each connected terminal instructed by the signal processing control part 20, the conference participating terminal selecting part 9C determines and sends terminal selecting information to the terminal selecting switch $9_P$-J. For instance, upon opening or closure of the teleconference P to which the terminal TM-J belongs, the conference participating terminal selecting part 9C transfers a control signal to the terminal selecting switch $9_P$-J to permit or inhibit the passage therethrough of audio signals. The terminal selecting switch $9_P$-J responds to the control signal to permit or inhibit the passage therethrough of audio signals. As the result of this, for example, in the combination of terminals shown in FIG. 21C, the audio signals originating from the terminals TM-1 to TM-3 are assigned to the mixing/branching part 17-1 and the audio signals from the terminals TM-3 to TM-6 are assigned to the mixing/branching part 17-2.

Turning now to FIG. 23, the internal construction of the mixing/branching part 17-P will be described. The left- and right-channel audio signals fed from each terminal selecting switch $9_P$-J are applied to the mixers 5L and 5R, respectively, and at the same time, they are provided to delay parts D-JL and D-JR as well. The mixer 5L mixes together N inputted left-channel audio signals and outputs the mixed left-channel audio signal to the branch point 6L. The mixer 5R similarly mixes together N inputted right-channel audio signals and outputs the mixed right-channel audio signal to the branch point 6R. The branch point 6L branches the mixed left-channel audio signal inputted thereto to N cancelers 26-JL (J=1, . . . , N). Likewise, the branch point 6R branches the mixed right-channel audio signal inputted thereto to N cancelers 26-JR (J=1, . . . , N).

The delay part D-JL delays for a time $\tau_{JL}$ the left-channel audio signal fed from the terminal selecting switch $9_P$-J and applies the delayed left-channel audio signal to the canceler 26-JL. The delay $\tau_{JL}$ is selected to be the sum of the delay by the audio signal processing in the mixer 4L and the delay by the audio signal processing in the branch point 6L. In consequence, the left-channel audio signal outputted from the delay part D-JL and that left-channel audio signal component in the left-channel mixed audio signal from the branch point 6L that was outputted from the terminal selecting switch $9_P$-J are synchronized with each other. The delay $\tau_{JR}$ of the delay part D-JR is also similarly determined, and the right-channel audio signal outputted from the delay part D-JR and that right-channel audio signal component in the right-channel mixed audio signal from the branch point 6R which was outputted from the terminal selecting switch 9P-L are synchronized with each other.

The cancelers 26-JL and 26-JR cancel the delayed audio signals fed from the delay parts D-JL and D-JR from the audio signals fed from the branch points 6L and 6R, respectively. As the result of this, the above-mentioned components cancel each other, and in the channel corresponding to each terminal TM-J, a mixed audio signal originating from other channels K (J≠K) is obtained. This mixed audio signal is applied to the conference selecting switch 7-P. That is, the audio signal originating from each terminal TM-J is excluded from the audio signal that is transmitted to that terminal TM-J. Thus an echo can be cancelled which is attributed to the audio communication control unit 100 of this embodiment.

Turning back to FIG. 22, the conference selecting part 7C determines conference selecting information in response to teleconference P opening/closure information instructed by the signal processing control part 20. This conference selecting information is transferred to the conference selecting switch 7-P. For example, when the teleconference P is opened or closed, a control signal is transferred to the terminal selecting switch $9_P$-J to permit or inhibit the passage therethrough of audio signals. The conference selecting switch 7-P responds to the control signal from the conference selecting part 7C to permit or inhibit the passage therethrough of the audio signal outputs from the mixing/branching part 17-P, i.e. from the cancelers 26-JL and 26-JR.

The inter-combination mixers 2-JL and 2-JR respectively add the left- and right channels of Q combinations of terminals Ps selected by the conference selecting switches 7-P (P=1, . . . , Q) from J-th channels of the Q mixing/branching parts 17-P (P=1, . . . , Q) corresponding to the Q combinations of terminals. The reference character $P_S$ is the number of the combination of terminals (or the conference number) for which audio signals are mixed together and a maximum of Q combinations can be selected in the range of $0 \leq P_S \leq Q$. The corresponding left- and right-channel audio signals of the selected combinations of terminals mixed together and the mixed audio signals are sent to each terminal TM-J, at which the user can listen to sounds from all the other terminals belonging to the selected multiple terminal combinations (multiple teleconferences). The audio signal originated from the terminal TM-J is sent to all the other terminals selecting those terminal combinations including the terminal TM-J. Each multiplexing/coding part 22-J multiples and encodes the left- and right-channel audio signals fed from the inter-combination mixing parts 2-JL and 2-JR. That is, the multiplexing/coding part 22J multiplexes the stereo audio signals corresponding to left and right channels into one-channel audio signals and encodes them. As a result, the encoded one-channel multiplexed signals are independently applied to the switching part 11 for each terminal TM-J and the one-channel multiplexed audio signals are transmitted to each terminal TM-J ($1 \leq J \leq M$) over one communication line.

Figure 22:
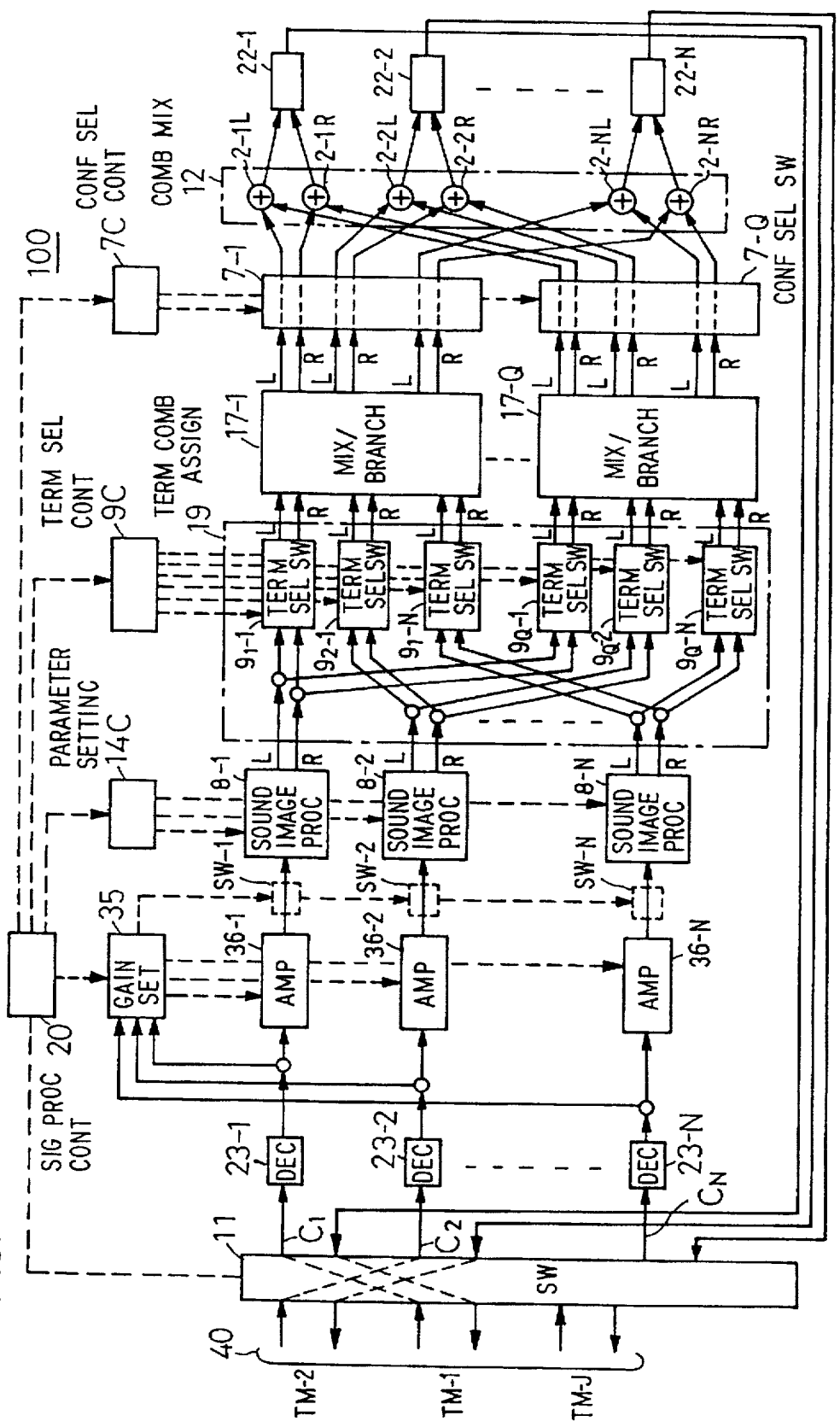
FIG. 22 is a block diagram of a fifth embodiment of the present invention illustrating an example of the construction of the FIG. 20 embodiment.

According to the embodiment of FIG. 22, even when two teleconferences are being held by the terminals TM-1 to TM-6 as shown in FIG. 21C, the listeners in the two conferences can each localize sounds originated from the other terminals at different target positions spaced 36 degrees apart; hence, it is possible to simultaneously realize a teleconference X exclusive to the terminals TM-1 to TM-3 and a teleconference Y exclusive to the terminals TM-3 to TM-6. In this case, the listener at the terminal TM-3 can listen to sounds originated from the terminals TM-4 to TM-6 as well as from the terminals TM-1 and TM-2. Additionally, even if a teleconference by all the terminals TM-1 to TM-6 is in progress, the teleconference X by the terminals TM-1 to TM-3 can be implemented. In the above, the operation of the audio communication control unit 100 has been described on the assumption that a certain terminal such as TM-3 takes part in the multiple teleconferences X and Y; if one terminal such as TM-1 participates in the teleconference X alone in FIG. 21C, it is sufficient only to apply audio signals from one conference selecting switch corresponding to the conference X to, for example, the mixing parts 2-1L and 2-1R corresponding to the terminal TM-1.

As depicted in FIG. 21C, even in applications of the multi-point audio communication to, for instance, a dialog between particular speakers in a general teleconference or monitoring of each teleconference, the listener can localize sound originated from each terminal at a different target position. This assists identification of each speaker and improves the intelligibility. The advantage of this embodiment is that the sound image processing part for sound localization need not be introduced into each terminal TM-J. Thus it is economically feasible to implement teleconferencing service that enables all conference participants to develop natural communications with the other members as if they were in the same space.

As described above, the embodiment of FIG. 22 has Q mixing/branching parts 17-1 to 17-Q corresponding to Q teleconferences, and upon receiving from each terminal TM-J the control signal designating one or more teleconferences in which the user of that terminal intends to participate (speak), the signal processing control part 20 applied the control signal to the conference participating terminal selecting part 9C. The conference participating terminal selecting part 9C turns ON so that one or more of the Q terminal selecting switches $9_P$-J (P=1, ..., Q) for the audio signal originated from the terminal TM-J are mediated to the mixing/branching part 17-P corresponding to the teleconferences specified by the control signal. Therefore, the audio signal originated from the terminal TM-J can be connected to the one or more teleconferences designated by the terminal TM-J and its user can join the teleconferences. Additionally, the FIG. 22 embodiment has Q conference selecting switches 7-1 to 7-Q connected to the outputs of the Q mixing/branching part 17-1 to 17-Q. Upon receiving from each terminal TM-J the control signal designating one or more teleconferences the user of that terminal intends to monitor, the signal processing control part 20 passes the control signal to the conference selecting part 7C. The conference selecting part 7C responds to the control signal to turn OFF the conference selecting switches connected to the one or more mixing/branching parts corresponding to the teleconferences specified by the control signal, thereby mediating audio signals of the designated one or more teleconferences to the terminal TM-J.

Hence, transmission of a control signal to the audio communication control unit of the present invention as needed, enables the user at each terminal TM-J to change, join or leave communications in which he monitors or participates.

In the audio communication control unit 100 of FIG. 22, the two-channel audio signal (or stereo signal) can be sent to each terminal TM-J over a two-channel communication line instead of using a one-channel communication line. In this case, one communication line is used for the audio signal of each channel and the switching part 11 is required to switch three lines for each input into and output from the terminal TM-J-this avoids multiplexing in the multiplexing/coding part 22-J and demultiplexing at each terminal TM-J. In such an instance, however, two coding part 22-J are required for the left and right channels, resulting in the construction becoming complex accordingly.

SIXTH EMBODIMENT

Figure 24:
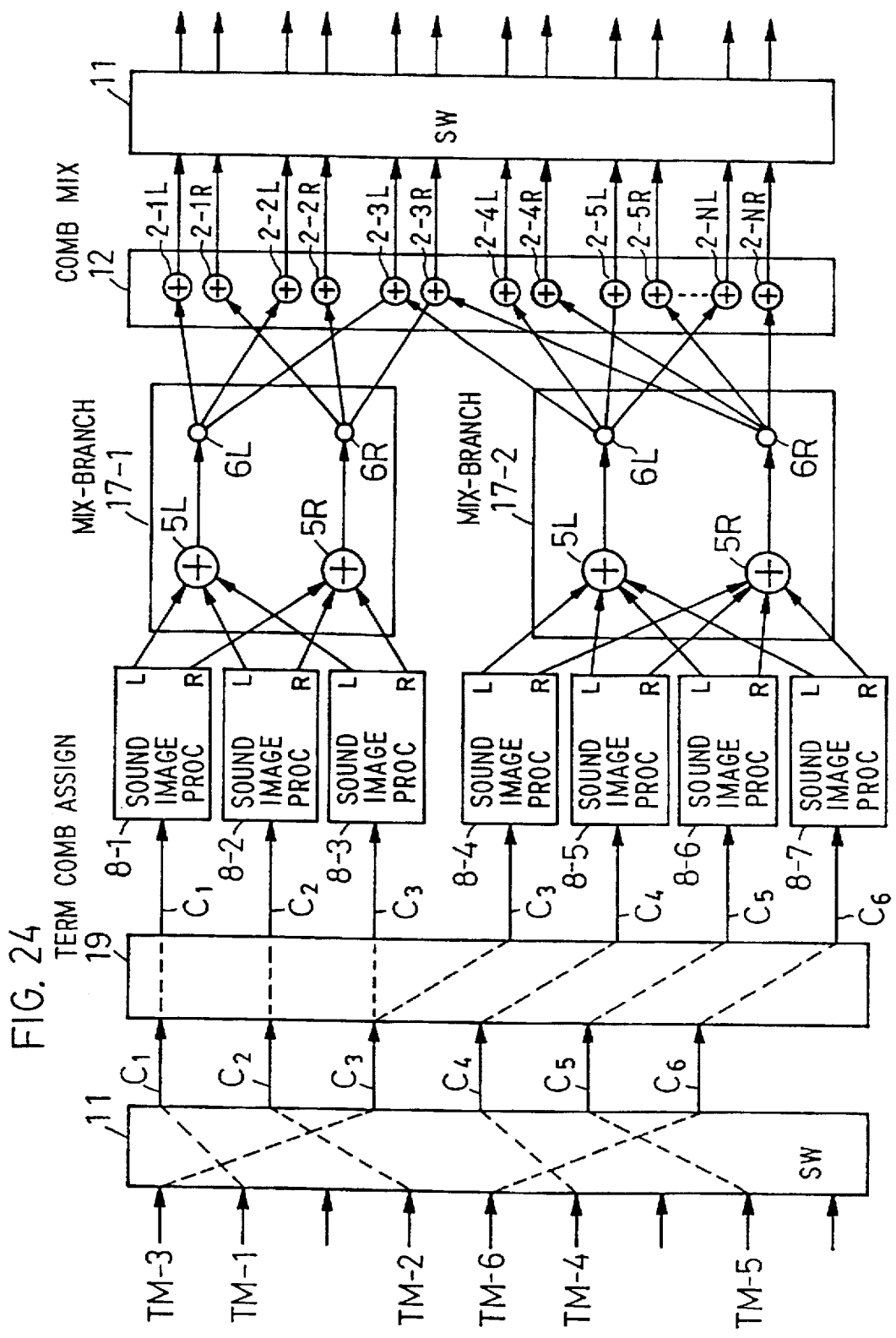
FIG. 24 is a block diagram of a sixth embodiment of the present invention illustrating a modified form of the FIG. 20 embodiment.
Figure 26A:
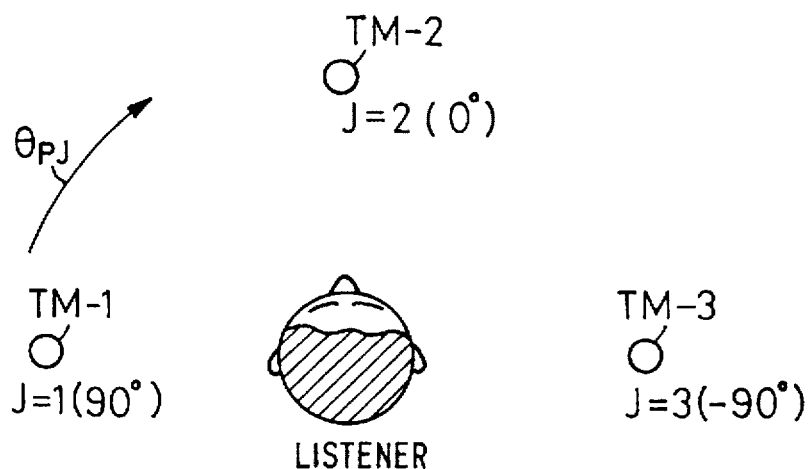
FIG. 26A is a diagram showing an example of target positions for sound localization possible in one teleconference by the embodiment of FIGS. 24 or 25.
Figure 26B:
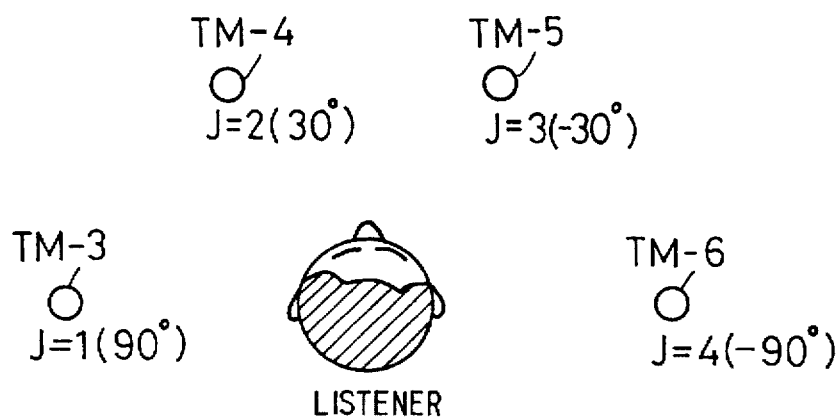
FIG. 26B is a diagram showing an example of target positions for sound localization possible in another teleconference by the embodiment of FIGS. 24 or 25.

FIG. 24 illustrates the basic configuration of a modified form of the embodiment shown in FIG. 20. The practical use is the same as in the embodiments depicted in FIGS. 20 and 22. The audio communication control unit of this embodiment is identical in construction to the FIG. 20 embodiment except that the combination assignment part 10 is provided at the stage preceding the sound image processing pat 8-J. Since the combination assignment part 19 is provided at the input side of the sound image processing part 8-J, the audio signal processing for sound localization is carried out after a combination of connected terminals is determined. This allows setting of the target positions of sounds originated from the terminals TM-1 to TM-3 or TM-3 to TM-6 for the teleconferences X and Y, respectively, as shown in FIGS. 26A and 26B.

SEVENTH EMBODIMENT

Figure 25:
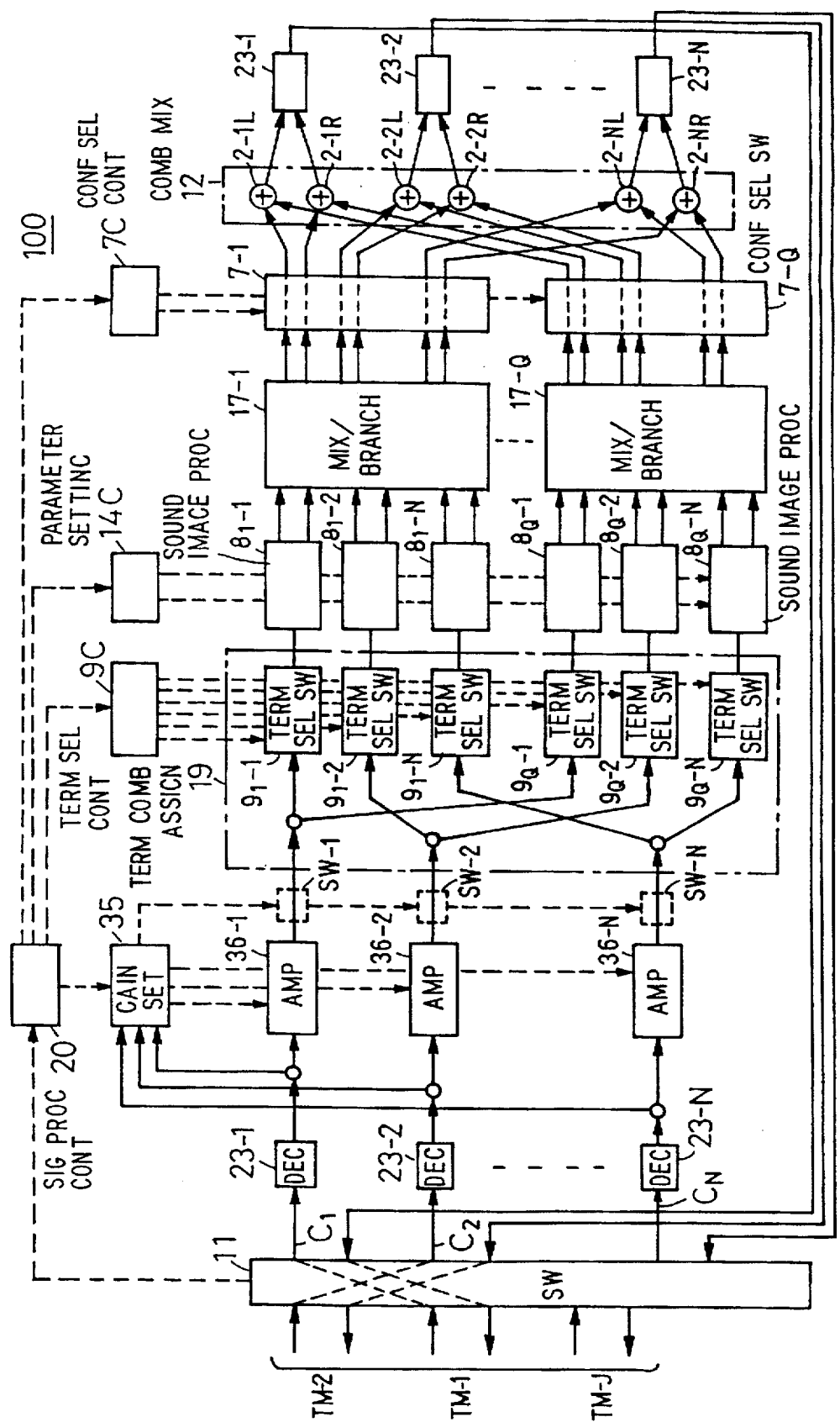
FIG. 25 is a block diagram of a seventh embodiment illustrating an example of the construction of the FIG. 24 embodiment.

In FIG. 25 there is illustrated a concrete example of the basic configuration shown in FIG. 24, the parts corresponding to those in FIG. 22 being identified by the same reference numerals. The construction and functions of this embodiment are mostly similar to those in the FIG. 22 embodiment. This embodiment also provides multi-point teleconferencing service that enables each terminal to participate in multiple teleconferences at the same time and the user at each terminal to listen to sounds originated from the other terminals, localizing their sounds at different target positions. Further, this embodiment is common to the FIG. 22 embodiment in that the sound image processing part is dispensable at each terminal TM-J or in the combination P of terminals. A description will be given of this embodiment, focusing on differences between it and the embodiment of FIG. 22.

The signal processing control part 20 receives, from respective terminals via the switching part 11, such control signals as those on communication start/end, connection confirmation and the membership of the teleconferences P assigned by combinations of connected terminals TM-J. The signal processing control part 20 detects according to these control signals the information on the connected terminal TM-J, the number M of connected terminals, communication start/end, the membership of the teleconferences P and the number of terminals belonging to each teleconference P. Additionally, the signal processing control part 20 sends information of the detected terminals and the number M of connected terminals to the amplification factor setting part 35, sends the communication start/end information to the conference participating terminal selecting part 9C and the conference selecting part 7C, sends the membership of each connected terminal TM-J in the teleconferences P to the conference participating terminal selecting part 9C, and sends the number $M_P$ of terminals belonging to each teleconference P to the parameter setting part 14C.

For each combination of terminals P, the parameter setting part 14C sets in the sound image processing parts 8-J acoustic transfer functions $H_L(\theta_{PJ})$ and $H_R(\theta_{PJ})$ that are convolved with the audio signals originated from all terminals $TM_P$-J of the combination P relating to target positions $TM_{PJ}$. In this embodiment, the target position $\theta_{PJ}$ for sound originated from each terminal TM-J is determined on the basis of the number $M_P$ of terminals belonging to the teleconference P detected in the signal processing control part 20. As exemplified in FIG. 21C, the respective target positions $\theta_{PJ}$ are determined at equiangular intervals of $180/(M_P-1)$ degrees about the listener at angular positions (+90°)-(0°)-(-90°) from his left to right side in a horizontal plane. Letting the numbers of terminals TM-J belonging to the teleconference P be $J_P$ ($1 \leq J_{P\leq} \leq M_P$) in a sequential order, the target positions $\theta_{PJ}$ are determined by 90–180 $(J_P-1)/(M_P-1)$ degrees as described previously.

The one-channel audio signal originated from each terminal TM-J is distributed to Q terminal selecting switches $9_P$-J (P=1, ..., Q). Each terminal selecting switch $9_P$-J controls passage therethrough of each one-channel audio signal in response to a control signal sent from the conference participating terminal selecting part 9C, and the audio signal having passed through the terminal selecting switch $9_P$-J is applied to the corresponding sound image processing part $8_P$-J. In each sound image processing part $8_P$-J the acoustic transfer functions $H_L(\theta_{PJ})$ and $H_R(\theta_{PJ})$, set in the parameter setting part 14C, are convolved with the audio signal outputted from the terminal selecting switch $9_P$-J to obtain a two-channel audio signal, which is fed to the mixing/branching part 17-P. There are provided N (J=1, ..., N) sound image processing parts $8_P$-J for each set P of terminals, whereas in FIG. 22 the number of sound image processing part 8-J is only N. The terminal selecting switch $9_P$-J in FIG. 22 differs from the counterpart in this embodiment of FIG. 25 in that the former interrupts the two-channel audio signal. The mixing/branching part 17-P are exactly identical in construction and operation to that in FIG. 23.

The FIG. 25 embodiment differs from the embodiment of FIG. 22 in the order of processing audio signals. In the embodiment of FIG. 25, one-channel audio signals originated from respective terminals TM-J are grouped for each combination P (P=1, ..., Q) of terminals, after which two-channel audio signal for sound localization at respective target positions is generated for each teleconference P. Accordingly, the respective terminals TM-J belonging to each teleconference P are allowed to set different target positions $8_{PJ}$ independently for each teleconference P. That is, it is possible to set in the parameter setting part 14C the acoustic transfer functions $H_L(\theta_{PJ})$ and $H_R(\theta_{PJ})$ as sound image control parameters for enabling the listener to localize sounds originated from the terminals TM-J belonging to each teleconference P at respective target positions $\theta_{PJ}$.

Now, a description will be given of a method how the spacing of target positions for sounds originated from respective terminals TM-N in each teleconference P is increased on the basis of the number $M_P$ of terminals belonging to the teleconference P. Consider the application of this method to the combinations of terminals shown in FIGS. 26A and 26B. Since the teleconference X is held among three terminals as shown in FIG. 26A, the target positions are spaced 90° apart. The target positions for the terminals TM-1, TM-2 and TM-3 are sequentially distributed at angular positions (+90°)-(0°)-(-90°) about the listener from his left to right side. Since the teleconference Y is held among four terminals, the target positions are spaced 60° apart. The target positions for sounds originated from the terminals TM-3, TM-4, TM-5 and TM-6 are sequentially distributed at angular positions (+90°)-(+30°)-(-30°)-(-90°) about the listener from his left to right side.

For comparison, consider the case where the target positions are determined using the number M of all connected terminals. Since the number M of all connected terminals is 6, the target positions are spaced 36° apart, and as shown in FIG. 21C, the target positions for sounds originated from the terminals TM-1 to TM-6 are sequentially distributed at angular positions (+90°)-(+54°)-(+18°)-(-18°)-(-54°)-(-90°) about the listener from his left to right side. In the embodiments of FIGS. 21A and 21B, since the combination is assigned after the processing for sound localization, the target positions cannot be independently set for each teleconference P; hence, the target position for sound originated from one terminal is fixed regardless of the combination of terminals. In such an instance, the target position distribution for the teleconference X among the terminals TM-1 to TM-3 is confined ranging from the right side (+90°) of the listener to the front of him on the right (+18°) as depicted in FIGS. 21A and 21B. In the teleconference Y involving the terminals TM-3 to TM-6, the target positions are distributed over the range from the front of the listener on the left (+18°) to the front of him on the right (-90°).

As described above, the embodiments of FIGS. 24 and 25 allow setting of the target positions for each of teleconferences. Additionally, by setting the target positions according to the number $M_P$ of terminals belonging to each combination (i.e. teleconference) P, the angular range of the distribution and the spacing of the target positions for sounds originated from each terminal can be wider than in the embodiments of FIGS. 20 and 22. Consequently, this embodiment allows the listener to identify each speaker more easily and to provide further improved intelligibility than in the embodiments of FIGS. 20 and 22.

According to the FIG. 25 embodiment, when the number of terminals participating in a teleconference changes, the target positions of sounds originated from the terminals participating can be updated accordingly. In such an instance, the target positions of sounds originated from all the conference participating terminals can be determined following a model for arrangement (a set of acoustic transfer functions $H_L(\theta_J)$ and $H_R(\theta_J)$) of the target positions of sounds originated from respective terminals predetermined by the signal processing control part 20 of the audio communication control unit 100 in accordance with respective numbers of participating terminals. That is, when the number M of conference participants changes in response to a request to leave or participate in the teleconference, the target positions to be assigned to remaining participants are renewed referring to the arrangement model according to the updated number of participants and the corresponding sets of acoustic transfer functions $H_L(\theta_j)$ and $H_R(\theta_j)$ are selected according to the renewed target positions and each set in one of the sound image processing parts 8-J. As an initial procedure of the teleconference, it is also possible to predetermine possible target positions according to the number of participants and allow the participants to customize those positions.

In the case where the sound image control parameters are set by the parameter setting part 14C in the embodiments of FIGS. 22 and 25, the target positions assignable to conference participants can be estimated in the signal processing control part 20 upon detection of the number M of terminals participating in each teleconference. While in the above the parameter setting part 14C has been described to determine which participants are assigned to which estimated target positions, there can be customization of currently assigned target position to a desired one even while the teleconference is in progress. For example, the audio communication unit 100 presets information about target positions determined for all the participants. When a user at a terminal changes the target position to a desired one during a teleconference, the terminal transmits to the audio communication control unit 100 a request-to-change signal indicating the desired position. In response to the request-to-change signal, the signal processing control part of the audio communication control unit 100 replaces, for example, the current position of the requesting terminal with the desired position and sends the new assignment information to all the participants.

In the embodiments of FIGS. 8 and 14, it is also possible to employ an arrangement in which switches SW-1 to SW-N are connected in series to the respective channels at the output side of the utterance detection processing part 23B as indicated by the broken lines and the utterance detection processing part 23B judges utterance of each channel, and holds the switch SW-J in that channel OFF except only during the utterance period, thereby suppressing noise originated from that channel. Utterance can be judged depending on whether the integrated power of the audio signal exceeds the threshold $E_{ON}$ as described previously herein with reference to FIG. 8. In the embodiments of FIGS. 16, 22 and 25, too, it is possible to assign switches SW-1 to SW-N in series to the outputs of the decoding parts 23-1 to 23-N as indicated by the broken lines, judge utterance of each channel according to the audio signal on the channel, and hold the channel by the amplification factor setting part 35 ON only during its utterance period.

As described above in detail, the audio communication control unit according to the present invention branches the audio signal from each terminal to multiple channels, mixes the branched audio signals originated from the respective terminals to produce a multiple-channel mixed audio signal for each branched channel and transmits the multiple-channel mixed audio signal to each of the terminals after branching it into respective channels. Hence the sound originated from at least one teleconference participant can be reproduced at each terminal in distinction from sounds originated from the other participants, avoiding the requirement of audio signal processing at the terminals for sound localization at desired target positions.

It will be apparent that many modifications and variations may be effected without departing from the scope of the novel concepts of the present invention.

What is claimed is:

1. An audio communication control unit for teleconferencing which is connected via a communication network to a plurality of terminals, comprising:

a switching part for switching audio signals received from N terminals via said communication network, N being an integer equal to or greater than three;

N input channels connected to said switching part and supplied with the input audio signals from said N terminals, respectively;

a channel branching part for branching each of said input audio signals from said N input channels into two branched audio signals of branched channels;

a sound image control part for processing said two branched audio signals of said two branched channels corresponding to each of said N input channels with a corresponding one of N parameter sets each including two sound image control parameters or predetermined kind of kinds to produce sound-image controlled audio signals of two branch channels corresponding to each of said N input channels, at least one of said N parameter sets being different from the other parameters sets according to target positions of said terminals;

a mixing part for mixing said sound-image controlled audio signals of two branch channels corresponding respectively to said N terminals, for each branch channel, to thereby generate mixed audio signals of two channels;

a terminal-associated branching part for branching said mixed audio signals of two channels in correspondence with said N terminals for input into said switching part; and signal processing control part for deciding a top-priority one of said N input audio signals as an audio signal of a principal speaker and the other remaining input audio signals as audio signals of other speakers;

wherein said channel branching part branches each of said N input audio signals fed thereto from said N input channels into first and second branch channel audio signals and outputs them as said two branched audio signals; and said sound image control part includes a phase control part which, under the control of said signal processing control part, sets said first and second branch channel audio signals corresponding to said principal speaker's audio signal to be in-phase with each other and sets said first- and second-channel audio signals corresponding to said other speakers' audio signals to be out-of-phase with each other.

2. An audio communication control unit for teleconferencing which is connected via a communication network to a plurality of terminals, comprising:

a switching part for switching audio signals received from N terminals via said communication network, N being an integer equal to or greater than three;

N input channels connected to said switching part and supplied with the input audio signals from said N terminals, respectively;

a channel branching part for branching each of said input audio signals from said N input channels into two branched audio signals of two branched channels;

a sound image control part for processing said two branched audio signals of said two branched channels corresponding to each of said N input channels with a corresponding one of N parameter sets each including two sound image control parameters of predetermined kind or kinds to produce sound-image controlled audio signals of two branch channels corresponding to each of said N input channels, at least one of said N parameter sets being different from the other parameter sets according to target positions of said terminals;

a mixing part for mixing said sound-image controlled audio signals of two branch channels corresponding respectively to said N terminals, for each branch channel, to thereby generate mixed audio signals of two channels;

a terminal-associated branching part for branching said mixed audio signals of two channels in correspondence with said N terminals for input into said switching part;

a speaker selecting part provided between said N input channels and said channel branching part, for selecting input audio signals to be mixed together from said input audio signals inputted through said N input channels via said switching part and for outputting said selected input audio signals;

N selected audio signals channels for applying said selected input audio signals from said speaker selecting part to said channel branching part; and a signal processing control part for controlling said speaker selecting part so that one of said input audio signals to be processed by said at least one of said N parameter sets, is outputted to a predetermined one of said N selected audio signal channels;

wherein said signal processing control part decides a top-priority one of said N input audio signals as an audio signal of a principal speaker and the other remaining input audio signals as audio signals of other speakers;

said speaker selecting part outputs, on the basis of the results of said decision by said signal processing control part, said principal speaker's audio signal and said other speakers' audio signals to said predetermined one of said N selected audio signal channels and the other remaining selected audio signal channels, respectively, as input to said channel branching part;

said channel branching part branches each of said N input audio signals applied thereto and outputs first- and second-branch channel audio signals as said branched audio signals of said two branch channels; and said sound image control part includes a phase control part which, under the control of said signal processing control part, sets said first- and second-branch channel audio signals corresponding to said principal speaker's audio signal from said predetermined one selected audio channel to be in-phase with each other and sets said first- and second-branch channel audio signals corresponding to said other speakers' audio signals from said other selected audio channels to be out-of-phase with each other.

3. An audio communication control unit for teleconferencing which is connected via a communication network to a plurality of terminals, comprising:

a switching part for switching audio signals received from N terminals via said communication network, N being an integer equal to or greater than three;

N input channels connected to said switching part and supplied with the input audio signals from said N terminals, respectively;

a channel branching part for branching each of said input audio signals from said N input channels into two branched audio signals of two branched channels;

a sound image control part for processing said two branched audio signals of said two branched channels corresponding to each of said N input channels with a corresponding one of N parameter sets each including two sound image control parameters of predetermined kind or kinds to produce sound-image controlled audio signals of two branch channels corresponding to each of said N input channels, at least one of said N parameter sets being different from the other parameter sets according to target positions of said terminals;

a mixing part for mixing said sound-image controlled audio signals of two branch channels corresponding respectively to said N terminals, for each branch channel, to thereby generate mixed audio signals of two channels; and a terminal-associated branching part for branching said mixed audio signals of two channels in correspondence with said N terminals for input into said switching part;

wherein said channel branching part branches each of said N input audio signal fed thereto into first and second branch channel audio signals and outputs them as said two branched audio signals;

a signal processing control part decides a top-priority one of said N input audio signals as an audio signal of a principal speaker and the other remaining input audio signals as audio signals of other speakers; and said signal processing control part sets said N parameter sets to said sound image control part such that said sound image control part attenuates said second branch channel audio signal corresponding to said decided principal speaker's audio signal by a first value sufficiently larger than the attenuation value of said first branch channel audio signal corresponding to said decided principal speaker's audio signal and attenuates said first branch channel audio signal corresponding to said other speakers' audio signals by a second value sufficiently larger than the attenuation value of said second branch channel audio signal corresponding to said other speakers' audio signals.

4. The audio communication control unit of claims 1 or 2, wherein said sound image control part includes an attenuation part which attenuates said other speakers' audio signals to a level lower than that of said principal speaker's audio signal under the control of said signal processing part.

5. The audio communication control unit of claims 1 or 3, further comprising an utterance detection processing part for monitoring levels of said input audio signals fed through said N input channels via said switching part from respectively corresponding said N terminals and for detecting utterance at each of said N terminals and wherein said signal processing control part decides a principal speaker on the basis of the utterance detected by said utterance detection processing part and controls said sound image control part according to the decision result.

6. An audio communication control unit for teleconferencing which is connected via a communication network to a plurality of terminals, comprising:

a switching part for switching audio signals received from N terminals via said communication network, N being an integer equal to or greater than three;

N input channels connected to said switching part and supplied with the input audio signals from said N terminals, respectively;

a channel branching part for branching each of said input audio signals from sid N input channels into two branched audio signals of two branched channels;

a sound image control part for processing said two branched audio signals of said two branched channels corresponding to each of said N input channels with a corresponding one of N parameter sets each including two sound image control parameters of predetermined kind or kinds to produce sound-image controlled audio signals of two branch channels corresponding to each of said N input channels, at least one of said N parameter sets being different from the other parameter sets according to target positions of said terminals;

a mixing part for mixing said sound-image controlled audio signals of two branch channels corresponding respectively to said N terminals, for each branch channel, to thereby generate mixed audio signals of two channels;

a terminal-associated branching part for branching said mixed audio signals of two channels in correspondence with said N terminals for input into said switching part;

a speaker selecting part provided between said N input channels and said channel branching part, for selecting input audio signals to be mixed together from said input audio signals inputted through said N input channels via said switching part and for outputting said selected input audio signals;

N selected audio signal channels for applying said selected input audio signals from said speaker selecting pan to said channel branching part; and a signal processing control part for controlling said speaker selecting part so that one of said input audio signals to be processed by said at least one of said N parameter sets, is outputted to a predetermined one of said N selected audio signal channels;

wherein said signal processing control part decides a top-priority one of said N input audio signals from said N input channels as an audio signal of a principal speaker and the other remaining input audio signals as audio signals of other speakers;

said speaker selecting part outputs said principal speaker's audio signal and said other speakers' audio signals to said predetermined one of said N selected audio channels and the other remaining selected audio signal channels, respectively, for input to said channel branching part;

said channel branching part branches each of said N input audio signals applied thereto into first and second branch channel audio signals and outputs them as said two branched audio signals; and said sound image control part includes an attenuation part which, under the control of said signal processing control part, attenuates said second branch channel audio signal from said predetermined one selected audio channel by a first attenuation value sufficiently larger than the attenuation value of said first branch channel audio signal from said predetermined one selected audio channel and attenuates each of said first-channel audio signals from said remaining selected audio channel by a second value sufficiently larger than the attenuation value of said second branch channels audio signals from said remaining selected audio channels.

7. An audio communication control unit for teleconferencing which is connected via a communication network to a plurality of terminals, comprising:

a switching part for switching audio signals received from N terminals via said communication network, N being an integer equal to or greater than 3;

N input channels connected to said switching part and supplied with the input audio signals from said N terminals, respectively;

a channel branching part for branching each of said input audio signals from said N input channels to K branched audio signals of K branched channels, K being an integer equal to or greater than 2;

a sound image control part for processing said K branched audio signals of said K branched channels corresponding to each of said N input channels with a corresponding one of N parameter sets each including K sound image control parameters of predetermined kind or kinds to produce sound-image controlled audio signals of K branch channels corresponding to each of said N input channels, at least one of said N parameter sets being different from the other parameter sets according to target positions of said terminals;

a mixing part for mixing sound-image controlled audio signals of K branch channels corresponding respectively to said N terminals, for each branch channel, to thereby generate mixed audio signals of K channels;

a terminal-associated branching part for branching said mixed audio signals of K channels in correspondence with said N terminals for input into said switching part; and a cancelling part for cancelling from each of said K-channel mixed audio signals distributed by said terminal-associated branching part to each of said N terminals, respectively, the component of each of said K-channel sound-image controlled audio signals from said sound image control part corresponding to said each terminal.

8. An audio communication control unit for teleconferencing which is connected via a communication network to a plurality of terminals, comprising:

a switching part for switching audio signals received from N terminals via said communication network, N being an integer equal to or greater than 3;

N input channels connected to said switching part and supplied with the input audio signals from said N terminals, respectively;

a channel branching part for branching each of said input audio signals from said N input channels into K branched audio signals of K branched channels, K being an integer equal to or greater than 2;

a sound image control part for processing said K branched audio signals of said K branched channels corresponding to each of said N input channels with a corresponding one of N parameter sets each including K sound image control parameters of predetermined kind or kinds to produce sound-image controlled audio signals of K branch channels corresponding to each of said N input channels, at least one of said N parameter sets being different from the other parameter sets according to target positions of said terminals;

a mixing part for mixing said sound-image controlled audio signals of K branch channels corresponding respectively to said N terminals, for each branch channel, to thereby generate mixed audio signals of K channels; and a terminal-associated branching part for branching said mixed audio signals of K channels in correspondence with said N terminals for input into said switching part;

wherein Q sets of said mixing part and said terminal-associated branching part are provided in correspondence with Q teleconferences; Q being an integer equal to or greater than 2;

said audio communication control unit further comprising a combination assignment part for applying said K-channel sound-image controlled audio signal from said sound image control part, which corresponds to each of said N terminals, to designated one or more mixing parts; and an inter-combination mixing part for mixing together, for a corresponding one of the K channels, said K-channel mixed audio signals distributed from one or more of said terminal-associated branching parts and for outputting said channel-associated mixed audio signals to said each terminal;

said K channels being left and right channels and said sound image control parts each generating, for each terminal, a stereo audio signal of left and right channels as said sound-image controlled audio signal by convolving said branched audio signals of said left and right channels corresponding to said each terminal, respectively, with a pair of acoustic transfer functions used as said sound image control parameters, which correspond to a target position of a sound source different for each of said N terminals.

9. The audio communication control unit of claim 8, further comprising a signal processing control part which detects the number of said terminals participating in any of said Q teleconferences by detecting signals requesting to participate in the teleconferences from said terminals, determines a plurality of target positions of the same number as the number of terminals participating in the teleconferences, determines said pairs of acoustic transfer functions as said sound image control parameters corresponding to said determined target positions and provides said determined pairs of acoustic transfer functions to said sound image control parts, respectively.

10. The audio communication control unit of claim 9, wherein, letting the numbers of terminals participating in all teleconferences be represented by M, wherein M is an integer equal to or greater than 2, said signal processing control part determines said target positions for all conference participating terminals to be symmetric left-right positions at intervals of $180/(M-1)$ degrees.

11. An audio communication control unit for teleconferencing which is connected via a communication network to a plurality of terminals, comprising:

a switching part for switching audio signals received from N terminals via said communication network, N being an integer equal to or greater than 3;

N input channels connected to said switching part and supplied with the input audio signals from said N terminals, respectively;

a channel branching part for branching each of said input audio signals from said N input channels into K branched audio signals of K branched channels, K being an integer equal to or greater than 2;

a sound image control part for processing said K branched audio signals of said K branched channels corresponding to each of said N input channels with a corresponding one of N parameter sets each including K sound image control parameters of predetermined kind or kinds to produce sound-image controlled audio signals of K branch channels corresponding to each of said N input channels, at least one of said N parameter sets being different from the other parameter sets according to target positions of said terminals;

a mixing part for mixing said sound-image controlled audio signals of K branch channels corresponding respectively to said N terminals, for each branch channel, to thereby generate mixed audio signals of K channels;

a terminal-associated branching part for branching said mixed audio signals of K channels in correspondence with said N terminals for input into said switching part;

wherein Q sets of said channel branching part, said sound image control part, said mixing part and said terminal-associated branching part are provided, Q being an integer equal to or greater than 2;

a combination assignment part for applying said input audio signal from each of said N terminals via said switching part to designated one or more of said channel branching parts; and an inter-combination mixing part for mixing together, for a corresponding one of the K channels, said K-channel mixed audio signals distributed from designated one or more of said terminal-associated branching parts and outputting said channel-associated mixed audio signal to said each terminal; and wherein said K channels are left and right two channels and said Q sound image control parts corresponding to said teleconferences each generate, for each terminal, a stereo audio signal of left and right channels as said sound-image controlled audio signal by convolving a pair of acoustic transfer functions as said sound image control parameters, which correspond to a target position of a sound source different for each of said N terminals, into said branched audio signals of said left and right channels corresponding to said each terminal, respectively.

12. The audio communication control unit of claim 11, further comprising a signal processing control part which detects the number of terminals participating in each of said teleconferences by detecting signals requesting to participate in said each teleconference from said N terminals, determines pairs of acoustic transfer functions corresponding to target positions of the same number as said detected number of participating terminals for said each teleconference and sets said determined pairs of acoustic transfer functions in that one of said sound image control parts corresponding to said each teleconference.

13. The audio communication control unit of claim 12, wherein, letting the number of terminals participating in each teleconference be represented by $M_p$, wherein Mp is an integer equal to or greater than 2, said signal processing control part determines said target positions for all conference participating terminals to be symmetric left-right positions at intervals of $180/(M_p-1)$ degrees.

14. The audio communication control unit of claim 12, wherein upon each change in the number of terminals participating in any one of said teleconferences by a request to participate in or leave said any one teleconference, said signal processing control part updates said target positions of said any one teleconference according to the new number of conference participating terminals, updates said pair of transfer functions according to said updated target positions and sets said updated pair of transfer functions in that one of said sound image control parts corresponding to said any one teleconference.

* * * * *